(12) United States Patent
Baek et al.

(10) Patent No.: US 11,622,366 B2
(45) Date of Patent: Apr. 4, 2023

(54) APPARATUS AND METHOD FOR TRANSMITTING AND RECEIVING PACKET DATA INFORMATION IN WIRELESS COMMUNICATION SYSTEM

(71) Applicant: Samsung Electronics Co., Ltd., Suwon-si (KR)

(72) Inventors: Sang Kyu Baek, Suwon-si (KR); Hyun Jeong Kang, Suwon-si (KR); Jong Hyung Kwun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/735,554

(22) Filed: May 3, 2022

(65) Prior Publication Data

US 2022/0264624 A1    Aug. 18, 2022

Related U.S. Application Data

(63) Continuation of application No. 16/760,747, filed as application No. PCT/KR2018/013141 on Nov. 1, 2018, now Pat. No. 11,337,241.

(30) Foreign Application Priority Data

Nov. 1, 2017 (KR) .......................... 10-2017-0144790

(51) Int. Cl.
*H04W 72/12* (2023.01)
*H04W 28/06* (2009.01)
(Continued)

(52) U.S. Cl.
CPC ..... *H04W 72/1284* (2013.01); *H04W 28/065* (2013.01); *H04W 72/1252* (2013.01);
(Continued)

(58) Field of Classification Search
CPC ... H04W 28/065; H04W 12/10; H04W 28/02; H04W 72/1252; H04W 72/1268;
(Continued)

(56) References Cited

U.S. PATENT DOCUMENTS

| 10,236,262 B2* | 3/2019 | Guilley | H01L 23/576 |
| 2003/0099254 A1* | 5/2003 | Richter | H04L 45/00 370/352 |

(Continued)

FOREIGN PATENT DOCUMENTS

| KR | 10-2011-0090812 A | 8/2011 |
| KR | 10-2018-0136841 A | 12/2018 |
| WO | 2017/122588 A1 | 7/2017 |

OTHER PUBLICATIONS

Korean Office Action dated May 25, 2022, issued in Korean Patent Application No. 10-2017-0144790.
(Continued)

*Primary Examiner* — Nathan S Taylor
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). According to various embodiments of the present disclosure, in a wireless communication system, a method of operation a terminal comprises a step of transmitting a buffer status report to a base station, wherein the buffer size of the buffer status report may include the size of at least one of a packet data convergence protocol (PDCP) header, a radio network control (RLC) header, and a medium access control (MAC) header.

17 Claims, 25 Drawing Sheets

(51) Int. Cl.
  *H04W 72/1268* (2023.01)
  *H04W 80/02* (2009.01)
  *H04W 80/06* (2009.01)
(52) U.S. Cl.
  CPC ........ *H04W 72/1268* (2013.01); *H04W 80/02* (2013.01); *H04W 80/06* (2013.01)
(58) Field of Classification Search
  CPC . H04W 72/1284; H04W 80/02; H04W 80/06; H04W 28/06; H04W 72/12
  See application file for complete search history.

(56) References Cited

U.S. PATENT DOCUMENTS

| | | | | |
|---|---|---|---|---|
| 2004/0137876 | A1* | 7/2004 | Fischer | H04W 12/106 455/410 |
| 2009/0104890 | A1* | 4/2009 | Wang | H04W 12/106 455/410 |
| 2010/0317420 | A1* | 12/2010 | Hoffberg | G06Q 30/0282 463/1 |
| 2010/0329135 | A1* | 12/2010 | Pelletier | H04W 72/1284 370/252 |
| 2011/0188408 | A1 | 8/2011 | Yi et al. | |
| 2013/0114445 | A1* | 5/2013 | Wen | H04W 72/1252 370/252 |
| 2014/0023010 | A1* | 1/2014 | Loehr | H04W 52/365 370/329 |
| 2014/0023101 | A1* | 1/2014 | Wang | H01S 3/076 372/55 |
| 2016/0062954 | A1* | 3/2016 | Ruff | G06F 40/205 715/249 |
| 2016/0366611 | A1* | 12/2016 | Fischer | H04W 72/042 |
| 2017/0251370 | A1* | 8/2017 | Liljenstam | H04W 12/106 |
| 2018/0027565 | A1* | 1/2018 | Kwon | H04W 28/0278 370/329 |
| 2018/0092118 | A1* | 3/2018 | Kim | H04W 72/1278 |
| 2018/0146467 | A1* | 5/2018 | Kim | H04W 80/02 |
| 2018/0176937 | A1* | 6/2018 | Chen | H04W 72/06 |
| 2018/0213575 | A1* | 7/2018 | Chen | H04W 76/27 |
| 2018/0227938 | A1* | 8/2018 | Lee | H04L 27/26 |
| 2018/0317123 | A1* | 11/2018 | Chen | H04W 72/0413 |
| 2018/0332467 | A1* | 11/2018 | Tenny | H04W 12/106 |
| 2018/0359802 | A1* | 12/2018 | Cho | H04L 69/22 |
| 2019/0021128 | A1* | 1/2019 | Sivavakeesar | H04W 76/19 |
| 2019/0159071 | A1* | 5/2019 | Yavuz | H04W 80/08 |
| 2019/0174575 | A1* | 6/2019 | Shah | H04W 80/08 |
| 2019/0230667 | A1* | 7/2019 | Loehr | H04W 72/0466 |
| 2019/0364137 | A1* | 11/2019 | Liu | H04W 28/06 |
| 2020/0120492 | A1* | 4/2020 | Xu | H04W 76/27 |
| 2020/0120660 | A1* | 4/2020 | Wang | H04W 72/04 |
| 2020/0229026 | A1* | 7/2020 | Parron | H04W 80/02 |
| 2020/0229111 | A1* | 7/2020 | Kim | H04W 28/06 |
| 2020/0296752 | A1* | 9/2020 | Baek | H04W 28/0278 |

OTHER PUBLICATIONS

Huawei, HiSilicon; Design of BSR format and BS table; 3GPP TSG-RAN WG2 #99bis; R2-1710202; Oct. 13, 2017; Prague, Czech Republic.

Intel Corporation; BSR enhancements; 3GPP TSG RAN WG2 Meeting #99bis; R2-1710606; Oct. 13, 2017; Prague, Czech Republic.

Catt; BSR MAC CE; 3GPP TSG-RAN WG2 #99bis R2-1710298; Oct. 13, 2017; Prague, Czech Republic.

Korean Notice of Patent Grant dated Feb. 8, 2023, issued in Korean Patent Application No. 10-2017-0144790.

* cited by examiner

APPARATUS AND METHOD FOR TRANSMITTING AND RECEIVING PACKET DATA INFORMATION IN WIRELESS COMMUNICATION SYSTEM

CROSS-REFERENCE TO RELATED APPLICATION(S)

This application is a Continuation application of prior application Ser. No. 16/760,747, filed on Apr. 30, 2020, which is a U.S. National Stage application under 35 U.S.C. § 371 of an International application number PCT/KR2018/013141, filed on Nov. 1, 2018, which is based on and claims priority of a Korean patent application number 10-2017-0144790, filed on Nov. 1, 2017, in the Korean Intellectual Property Office, the disclosure of which is incorporated by reference herein in its entirety.

BACKGROUND ART

The disclosure relates generally to a wireless communication system and, more particularly, to an apparatus and a method for transmitting or receiving packet data information in a wireless communication system.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

DISCLOSURE OF INVENTION

Technical Problem

Based on the above-described discussion, the disclosure provides an apparatus and a method for delivering an exact buffer status of a terminal in a wireless communication system.

Further, the disclosure provides an apparatus and a method for reducing the throughput of a transmission/reception apparatus and protecting the integrity of data in a wireless communication system.

In addition, the disclosure provides an apparatus and a method for reducing the amount of resources used to report a buffer status in a wireless communication system.

In accordance with an aspect of the disclosure, an operating method of a terminal in a wireless communication system may include transmitting a buffer status report to a base station, wherein a buffer size of the buffer status report includes a size of at least one of a Packet Data Convergence Protocol (PDCP) header, a Radio Network Control (RLC) header, and a Medium Access Control (MAC) header.

In accordance with another aspect of the disclosure, an operating method of a terminal in a wireless communication system may include: determining one format among a short Buffer Status Report (BSR), a long BSR, a short truncated BSR, and a long truncated BSR; and transmitting a buffer status report to a base station according to the determined format.

In accordance with still another aspect of the disclosure, an operating method of a terminal in a wireless communication system may include: receiving, from a base station, a message indicating a pattern of integrity protection; and configuring the pattern of the integrity protection, wherein the pattern of the integrity protection indicates a packet to which the integrity protection is applied among multiple packets.

An apparatus and a method according to various embodiments of the disclosure enables a terminal to deliver an exact buffer status to a base station.

Further, the apparatus and the method according to various embodiments of the disclosure can reduce the load of a transmission/reception apparatus while protecting the integrity of data.

In addition, the apparatus and the method according to various embodiments of the disclosure can transmit a buffer status report by using a small amount of radio resources.

Effects obtainable from the disclosure may not be limited to the above mentioned effects, and other effects which are not mentioned may be clearly understood, through the following descriptions, by those skilled in the art to which the disclosure pertains.

BEST MODE FOR CARRYING OUT THE INVENTION

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

Hereinafter, the disclosure relates to an apparatus and a method for transmitting and receiving a packet in a wireless communication system. Specifically, the disclosure describes a technology for transmitting and receiving a packet through a buffer status report or integrity protection in a wireless communication system.

In the following description, terms referring to information-related variables (e.g., massages, packets), terms referring to network entities, terms referring to device elements, and the like are illustratively used for the convenience of description. Therefore, the disclosure is not limited by the terms as used below, and other terms referring to subjects having equivalent technical meanings may be used.

Further, the disclosure will be described using terms and names defined in 3rd generation partnership project (3GPP LTE) standards for the convenience of description. However, the disclosure is not limited by these terms and names, and various embodiments of the disclosure may be easily modified and applied to other communication systems.

Figure 1:
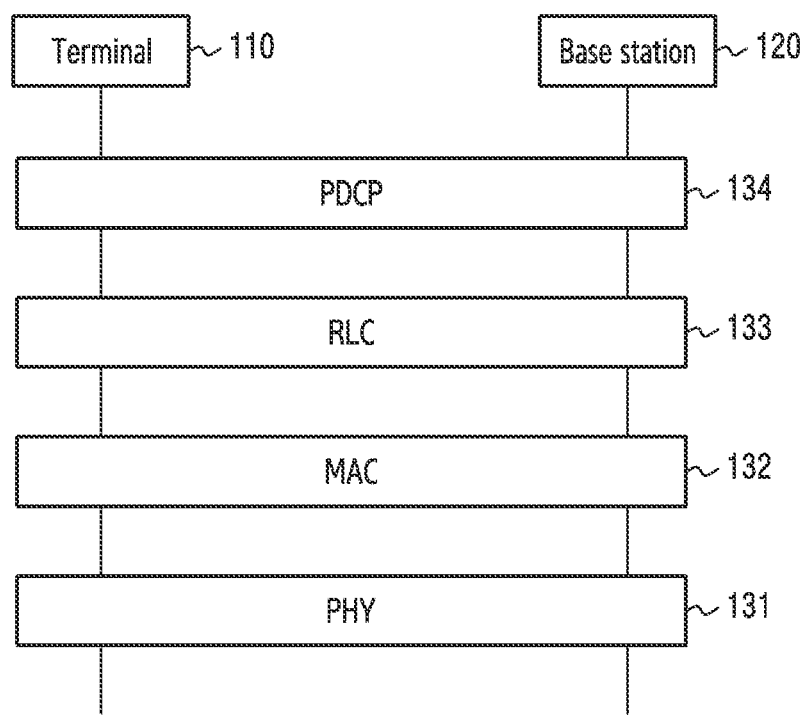
FIG. 1 illustrates a wireless communication system according to various embodiments of the disclosure.

FIG. 1 illustrates a wireless communication system according to various embodiments of the disclosure. FIG. 1 illustrates an example of a terminal 110 and a base station 120 as some of nodes using a wireless channel in a wireless communication system.

Referring to FIG. 1, the terminal 110 is an apparatus used by a user, and communicates with a base station of a corresponding operator via a wireless channel. In some cases, the terminal 110 may be operated without user involvement. For example, the terminal 110 is an apparatus that performs Machine-Type Communication (MTC), and may not be carried by a user. The terminal 110 may be referred to as a "User Equipment (UE)", a "Customer Premises Equipment (CPE)", a "mobile station", a "subscriber station", a "remote terminal", a "wireless terminal", an "electronic device", a "user device", or other terms having the equivalent technical meaning A terminal (e.g., the terminal 110) according to various embodiments of the disclosure may include at least one of, for example, a smart phone, a tablet PC, a mobile phone, a video telephone, an electronic book reader, a desktop PC, a laptop PC, a netbook computer, a workstation, a server, a Personal Data Assistant (PDA), a Portable Multimedia Player (PMP), an MP3 player, a medical device, a camera, or a wearable device.

A base station 120 is a network infrastructure which provides radio access to a terminal within a coverage. The base station 120 has a coverage defined as a predetermined geographic area based on the distance over which the base station 120 can transmit a signal. In the disclosure, the coverage may refer to a beam coverage that is a range over which a signal can be transmitted using beamforming. The base station 120 may be referred to as an "Access Point (AP)", an "eNodeB (eNB)", a "5th generation node (5G node)", a "5G NodeB (5G NB)", a "wireless point", a "Transmission/Reception Point (TRP)", a "Distributed Unit (DU)", a "Radio Unit (RU)", a "Remote Radio Head (RRH)", or other terms having the equivalent technical meaning.

The terminal 110 and the base station 120 may transmit or receive a control signal or a data signal to/from each other via a Physical (PHY) layer 131, a Medium Access Control (MAC) layer 132, a Radio Network Control (RLC) layer 133, and a Packet Data Convergence Protocol (PDCP) layer 134. The PHY layer 131 provides an information transmission service to a higher layer by using a physical channel. The PHY layer 131 is connected to the MAC layer 132, which is a higher layer, via a transport channel Data may be transmitted between the MAC layer and the PHY layer via the transport channel. The transport channels are classified according to types of data and transmission schemes in a case where data is transmitted via a wireless interface. Further, data is transmitted via a physical channel between different PHY layers, that is, the PHY layers of a transmitter and a receiver.

The MAC layer 132 may perform a function of: mapping between a logical channel and a transport channel; error correction through Hybrid Automatic Repeat Request (HARQ); priority handling; or multiplexing/demultiplexing into a transport block provided via a physical channel on a transport channel of a MAC Service Data Unit (SDU) belonging to a logical channel A service is provided from the MAC layer 132 to the RLC layer 133 via a logical channel. The logical channel may include a control channel for delivery of control region information; and a traffic channel for delivery of user region information.

The RLC layer 133 may perform concatenation, segmentation, resegmentation, sequence numbering, or reassembly of an RLC SDU (or an RLC Protocol Data Unit (PDU)). Further, the RLC layer 133 provides three modes, that is, a Transparent Mode (TM), an Unacknowledged Mode (UM), and Acknowledged Mode (AM), and an AM RLC provides error correction via an Automatic Repeat Request (ARQ).

The PDCP layer 134 provides delivery of user data, header compression or decompression, ciphering or deciphering, or integrity protection.

Although not illustrated in FIG. 1, an additional protocol of a higher layer than the PDCP layer may be considered in a user plane. For example, in a user plane, a protocol architecture of each of the terminal 110 and the base station 120 may further include a Service Data Adaptation Protocol (SDAP) layer for mapping between a Quality-of-Service (QoS) flow and a data radio bearer, as a higher layer than the PDCP layer 134. Further, in a control plane, a protocol architecture of each of the terminal 110 and the base station 120 may include a Radio Resource Control (RRC) layer, which performs configuration, configuration of system information, mobility control, measurement control, and the like, as a higher layer than the PDCP layer.

With reference to FIG. 1, the description has been made of the protocol stack for wireless communication between the terminal 110 and the base station 120. Hereinafter, a description will be made of operations of the terminal 110 and the base station 120 in each layer for efficient transmission/reception of packet data according to various embodiments.

Figure 2:
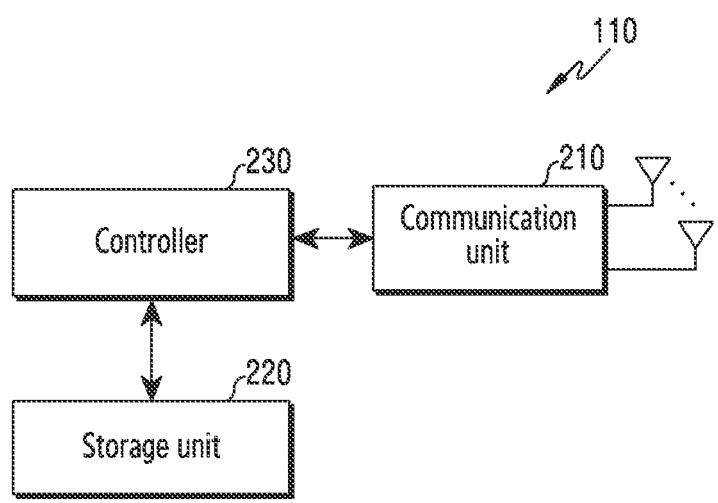
FIG. 2 illustrates a configuration of a terminal in a wireless communication system according to various embodiments of the disclosure.

FIG. 2 illustrates a configuration of a terminal in a wireless communication system according to various embodiments of the disclosure. The configuration exemplified in FIG. 2 may be understood as the configuration of the terminal 110. The term " . . . unit", the term ending with the suffix " . . . or" or " . . . er", or the like, which is used hereinafter, may refer to a unit of processing at least one function or operation, and this configuration may be implemented in hardware, software, or as a combination of hardware and software.

Referring to FIG. 2, the terminal 110 includes a communication unit 210, a storage unit 220, and a controller 230.

The communication unit 210 is configured to perform functions of transmitting or receiving a signal via a wireless channel. For example, the communication unit 210 is configured to perform a function of conversion between a baseband signal and a bit stream according to a physical layer standard of the system. For example, the communication unit 210 is configured to, when data is transmitted, generate complex symbols by encoding and modulating a transmission bit stream. Also, the communication unit 210 is configured to, when data is received, reconstruct a reception bit stream by demodulating and decoding a baseband signal. Further, the communication unit 210 is configured to up-convert a baseband signal into a Radio Frequency (RF) band signal and then transmit the RF band signal via an antenna, and is configured to down-convert an RF band signal received via the antenna into a baseband signal. For example, the communication unit 210 may include a transmission filter, a reception filter, an amplifier, a mixer, an oscillator, a Digital-to-Analog Converter (DAC), an Analog-to-Digital Converter (ADC), and the like.

Further, the communication unit 210 may include multiple transmission/reception paths. In addition, the communication unit 210 may include at least one antenna array including multiple antenna elements. In terms of hardware, the communication unit 210 may include a digital circuit and an analog circuit (e.g., a Radio Frequency Integrated Circuit (RFIC)). In this example, the digital circuit and the analog circuit may be implemented as a single package. Also, the communication unit 210 may include multiple RF chains. Further, the communication unit 210 may perform beamforming.

Also, the communication unit 210 may include different communication modules configured to process signals in different frequency bands. Further, the communication unit 210 may include multiple communication modules in order to support multiple different radio access technologies. For example, the different radio access technologies may include Bluetooth (BT) Low Energy (BLE), Wi-Fi, Wi-Fi Gigabyte (WiGig), a cellular network (e.g., Long-Term Evolution (LTE)), and the like. Further, the different frequency bands may include a Super High Frequency (SHF) band (e.g., 2.5 GHz and 5 GHz) and a millimeter Wave (mmWave) band (e.g., 38 GHz and 60 GHz). According to various embodiments, a communication module may include at least one sensor. A sensor mounted on the communication module may provide, to a processor (e.g., a Communication Processor (CP)) within the communication module, measurement information (or sensor information) for an operation for directivity control.

The communication unit 210 transmits and receives signals as described above. Accordingly, the entirety or part of the communication unit 210 may be referred to as a "transmitter", a "receiver", or a "transceiver". Further, in the following description, transmission and reception performed via a wireless channel is used as a meaning including execution of the above-described processing by the communication 210.

The storage unit 220 is configured to store data, such as a basic program, an application program, and configuration information, for operation of the terminal 110. The storage unit 220 may be implemented by a volatile memory, a non-volatile memory, or a combination of a volatile memory and a non-volatile memory. Further, the storage unit 220 is configured to provide stored data in response to a request of the controller 230. According to various embodiments, the storage unit 220 may be configured to provide information on a buffer (e.g., a buffer status) of the terminal 110 in response to a request of the controller 230.

The controller 230 is configured to control an overall operation of the terminal 110. For example, the controller 230 is configured to transmit and receive signals via the communication unit 210. Also, the controller 230 is configured to record data in the storage unit 220 and read the recorded data therefrom. Further, the controller 230 may be configured to perform functions of a protocol stack (e.g., the PHY layer 131, the MAC layer 132, the RLC layer 133, and the PDCP layer 134 in FIG. 1, an SDAP layer, and an RRC layer) required by a communication standard. To this end, the controller 230 may include at least one processor or microprocessor, or may be a part of a processor. Further, a part of the communication unit 210 and the controller 230 may be referred to as a "CP". The controller 230 may include various modules configured to perform communication. According to various embodiments, when a BSR is triggered, the controller 230 may generate and transmit a BSR message. Also, in order to protect the integrity of packet data, the controller 230 may perform integrity protection according to a pattern. Further, the controller 230 may determine a format of a BSR. In addition, the controller 230 may control such that the terminal performs operations according to the various embodiments described below.

Figure 3:
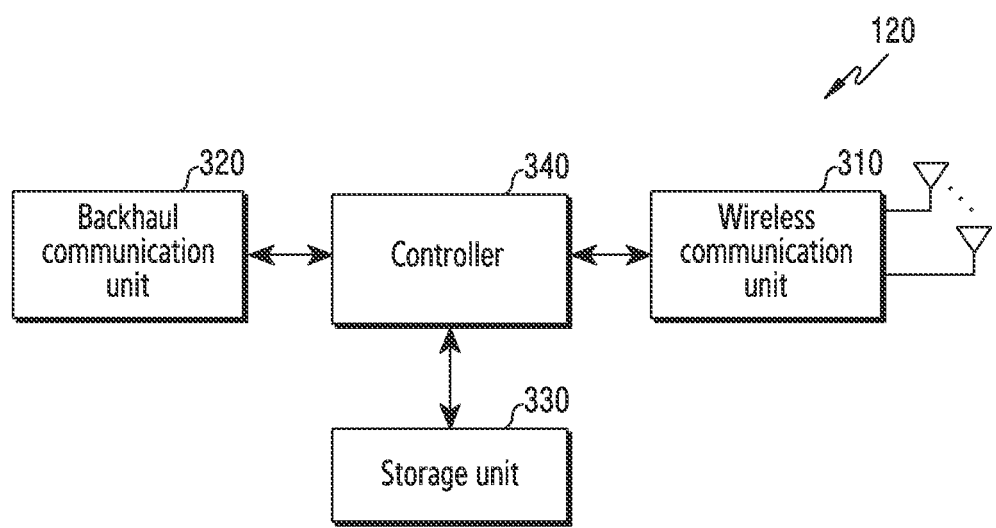
FIG. 3 illustrates a configuration of a base station in a wireless communication system according to various embodiments of the disclosure.

FIG. 3 illustrates a configuration of a base station in a wireless communication system according to various embodiments of the disclosure. The configuration exemplified in FIG. 3 may be understood as the configuration of the base station 120. The term " . . . unit", the term ending with the suffix " . . . or" or " . . . er", or the like, which is used hereinafter, may refer to a unit of processing at least one function or operation, and this configuration may be implemented in hardware, software, or as a combination of hardware and software.

Referring to FIG. 3, the base station 120 may include a wireless communication unit 310, a backhaul communication unit 320, a storage unit 330, and a controller 340.

The wireless communication unit 310 is configured to perform functions of transmitting or receiving a signal via a wireless channel. For example, the wireless communication unit 310 is configured to perform a function of conversion between a baseband signal and a bit stream according to a physical layer standard of the system. For example, the wireless communication unit 310 is configured to, when data is transmitted, generate complex symbols by encoding and modulating a transmission bit stream. Also, the wireless communication unit 310 is configured to, when data is received, reconstruct a reception bit stream by demodulating and decoding a baseband signal. Further, the wireless communication unit 310 is configured to up-convert a baseband signal into an RF band signal and then transmit the RF band signal via an antenna, and is configured to down-convert an RF band signal received via the antenna into a baseband signal.

To this end, the wireless communication unit 310 may include a transmission filter, a reception filter, an amplifier, a mixer, an oscillator, a DAC, an ADC, and the like. Also, the wireless communication unit 310 may include multiple transmission/reception paths. Further, the wireless communication unit 310 may include at least one antenna array including multiple antenna elements. In terms of hardware, the wireless communication unit 310 may include a digital unit and an analog unit, and the analog unit may include multiple sub-units according to operating power, an operating frequency, and the like.

The wireless communication unit 310 transmits and receives signals as described above. Accordingly, the entirety or part of the wireless communication unit 310 may be referred to as a "transmitter", a "receiver", or a "transceiver". Further, in the following description, transmission and reception performed via a wireless channel is used as a meaning including execution of the above-described processing by the wireless communication unit 310.

The backhaul communication unit 320 is configured to provide an interface for communication with other nodes in a network. That is, the backhaul communication unit 320 is configured to convert a bit stream, which is transmitted from the base station 120 to another node (e.g., another access node, another base station, a higher node, or a core network), into a physical signal, and is configured to convert a physical signal received from another node into a bit stream.

The storage unit 330 is configured to store data, such as a basic program, an application program, and configuration information, for operation of the base station 120. The storage unit 330 may be implemented by a volatile memory, a non-volatile memory, or a combination of a volatile memory and a non-volatile memory. Further, the storage unit 330 is configured to provide stored data in response to a request of the controller 340.

The controller 340 is configured to control an overall operation of the base station 120. For example, the controller 340 is configured to transmit and receive signals via the wireless communication unit 310 or the backhaul communication unit 320. Also, the controller 340 is configured to record data in the storage unit 330 and read the recorded data therefrom. Further, the controller 340 may be configured to perform functions of a protocol stack (e.g., the PHY layer 131, the MAC layer 132, the RLC layer 133, and the PDCP layer 134 in FIG. 1, an SDAP layer, and an RRC layer) required by a communication standard. To this end, the controller 340 may include at least one processor. According to various embodiments, the controller 340 may control such that the base station 120 performs operations according to the various embodiments described below.

Hereinafter, in the disclosure, a method for efficiently allocating resources by performing buffer status reporting will be described with reference to FIG. 4 to FIG. 11.

Figure 4:
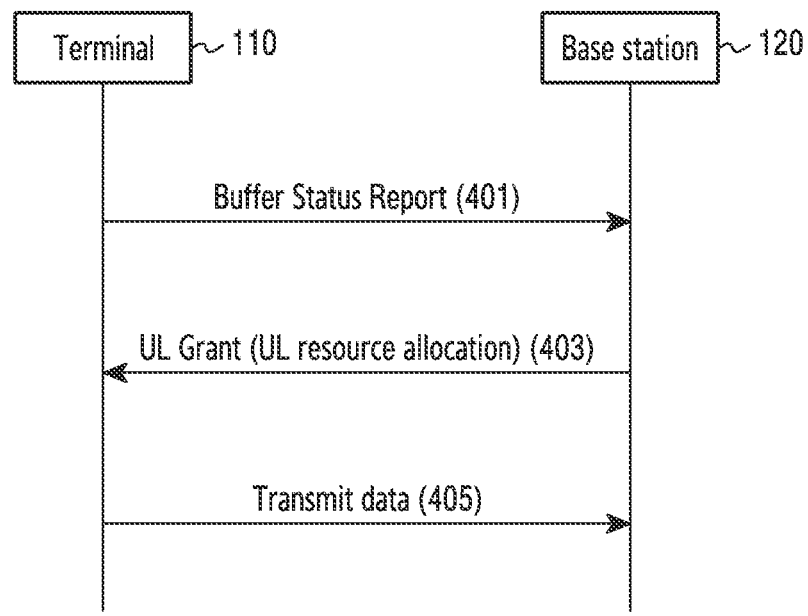
FIG. 4 illustrates a buffer status reporting procedure in a wireless communication system according to various embodiments of the disclosure.

FIG. 4 illustrates a buffer status reporting procedure in a wireless communication system according to various embodiments of the disclosure. A terminal of FIG. 4 is illustrated as an example of the terminal 110 of FIG. 1, and a base station of FIG. 4 is illustrated as an example of the base station 120 of FIG. 1.

In operation 401, the terminal may transmit a BSR to the base station. For efficient use of radio resources in an Uplink (UL), the base station is required to determine a type and an amount of data to be transmitted in the UL. Accordingly, the terminal transmits, to the base station, a BSR as information on the amount of data stored in a buffer of the terminal. The terminal may transmit a BSR message to the base station according to a predetermined condition. A format of the BSR message may be a format described below with reference to FIG. 15 or a format described below with reference to FIG. 17. A BSR message may include the amount of data which is to be transmitted in the UL for each Logical Channel Group (LCG).

In operation 403, the base station may determine a status of a buffer of the terminal. The base station may determine UL resources to be allocated to the terminal, based on the status of the buffer of the terminal. The base station assigns a UL grant to the terminal. In this example, the UL grant may indicate resources on which the terminal is to transmit data in the UL. The amount of resources indicated by the UL grant does not need to exactly coincide with the amount of data transmitted via a BSR. The base station may allocate resources for the terminal via a UL grant, which is generated more than once, based on the amount of data of the terminal which is reported by the BSR.

In operation 405, the terminal may transmit data. The terminal may transmit UL data to the base station on the resources allocated by the base station.

As described above, the terminal may be allocated UL resources by the base station according to a buffer status of the terminal which is delivered via a BSR message. That is, the terminal may be allocated UL resources in proportion to the amount of UL data which is to be transmitted by the terminal. Accordingly, the terminal is required to report an exact buffer status to the base station. For a smooth function between protocols, the terminal may add a header to a packet (e.g., a PDU) which is to be transmitted in each layer. In this example, sizes of the headers added to the respective packets may not be uniform.

Figure 5:
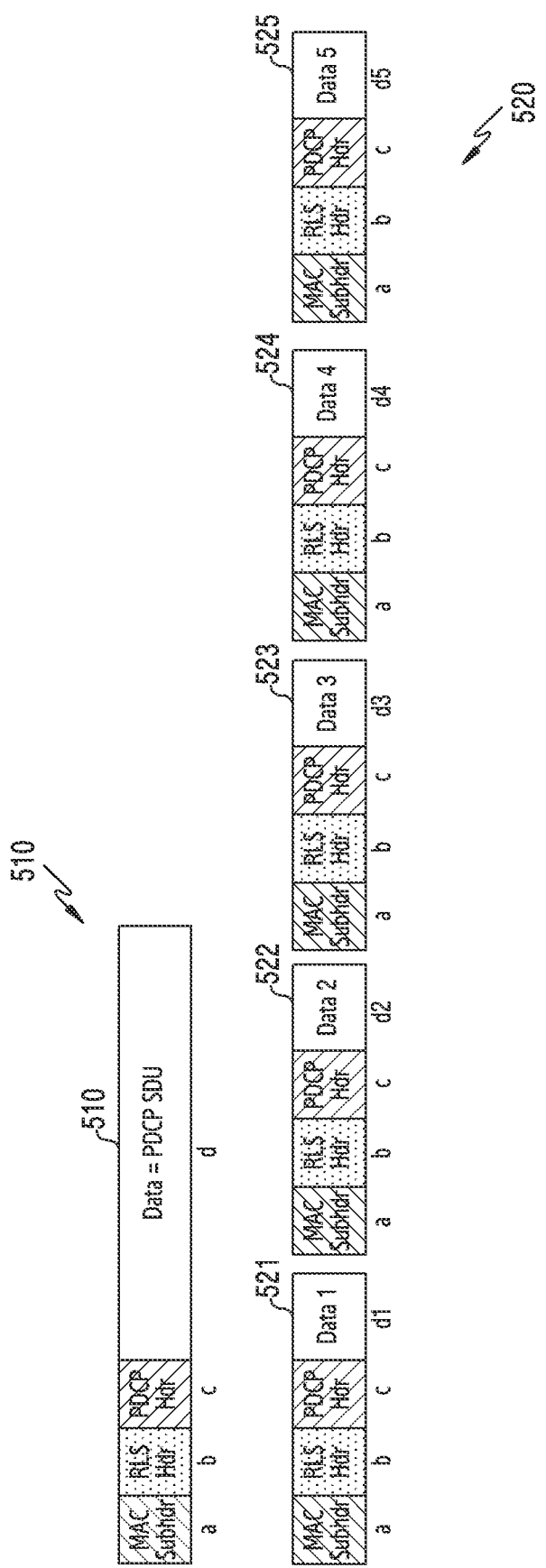
FIG. 5 illustrates an example of a Buffer Status Report (BSR) message in a wireless communication system.

FIG. 5 illustrates an example of a BSR message in a wireless communication system. FIG. 5 illustrates an example in which, despite pieces of data having the same size, sizes of headers needed during transmission of the data are different.

Referring to FIG. 5, a first message 510 may include a MAC subheader (MAC subhdr), an RLC header (RLC hdr), and a PDCP header (PDCP hdr) which are needed for transmission of a packet, and a packet 511. The packet 511 has a size of d, and the MAC subheader, the RLC header, and the PDCP header have respective sizes of a, b, and c. In general, a packet (e.g., data or a PDCP SDU) which is not segmented may be combined with one MAC subheader, one RLC header, and one PDCP header per packet. A second message 520 may include a total of five packets 521 to 525. The packets 521 to 525 may have respective sizes of d1, d2, d3, d4, and d5. Further, when the packets 521 to 525 are not segmented, each packet may be combined with one MAC subheader, one RLC header, and one PDCP header per packet. In the case of the same radio bearer, headers possessed by respective packets which are not segmented may all have the same size.

When the size of a header is not considered for each packet, the base station may not accurately allocate UL resources, from a BSR received from the terminal. For example, when d=d1+d2+d3+d4+d5, that is, when a size of the single packet 511 of the first message 510 is equal to the sum of sizes of the five packets (the packets 521 to 525) of the second message 520, if only a size of a packet except for a size of a header is reported to the base station, it may be difficult for the base station to exactly determine how many UL resources need to be allocated to the terminal. Even when a BSR also includes a size of a PDCP header during buffer status reporting, there is no information on a MAC subheader and an RLC header, and thus the terminal may transmit uncertain information to the base station. A size b of an RLC header may be considered as a size (e.g., a fixed size) of an RLC header which does not include a Segment Offset (SO) field. If a SO field is generated, according to various embodiments, the terminal may recalculate a size of an RLC header including the SO field.

Figure 6:
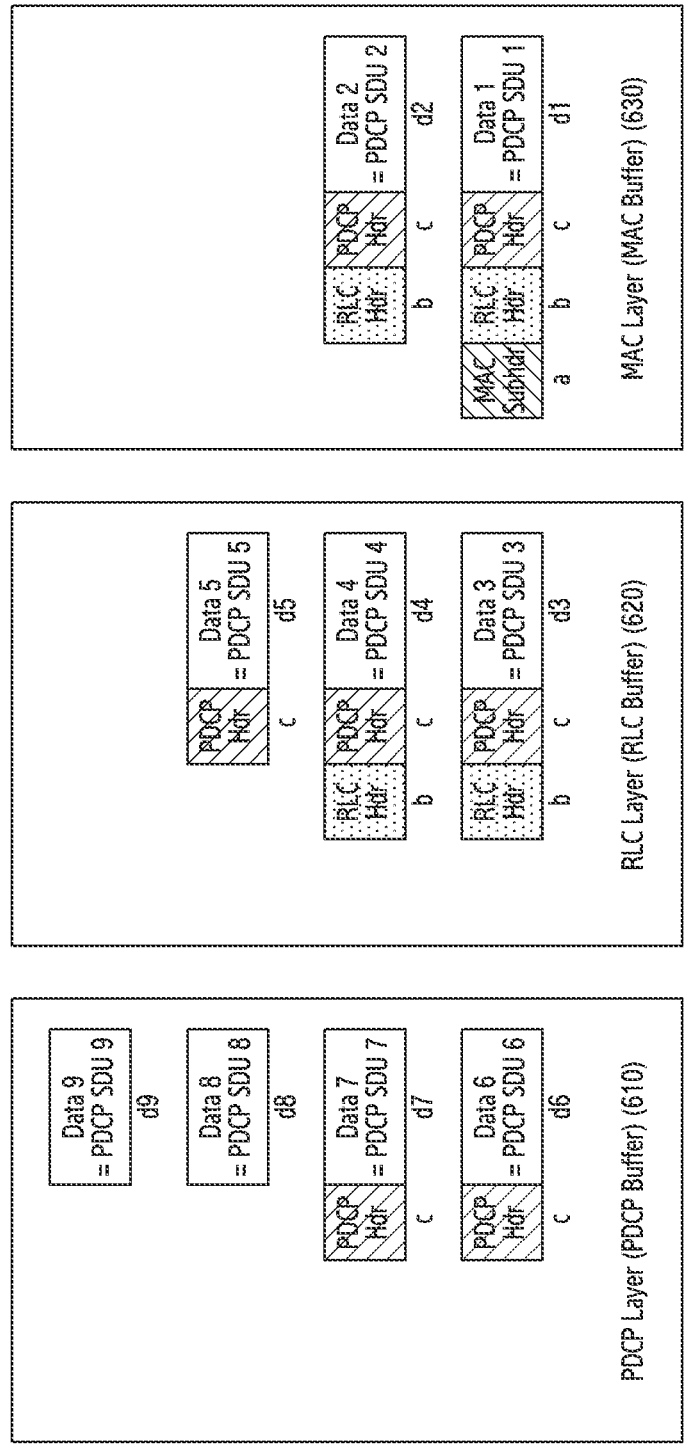
FIG. 6 illustrates an example of a buffer of a terminal according to various embodiments of the disclosure.

FIG. 6 illustrates an example of a buffer of a terminal according to various embodiments of the disclosure. The terminal is described as an example of the terminal 110 of FIG. 1.

Referring to FIG. 6, the buffer of the terminal may include a PDCP buffer 610, an RLC buffer 620, and a MAC buffer 630. As in FIG. 5, a MAC subheader, an RLC header, and a PDCP header are illustrated as having respective sizes of a, b, and c, and an n-th packet (e.g., a PDCP SDU or data) is illustrated as having a size of do (n represents a natural number).

The respective buffers represent the types of data that the terminal may have in a next-generation communication system. In general, a second layer (layer 2) of a wireless communication system may be divided into a PDCP layer, an RLC layer, a MAC layer, and the like. According to implementation of layers, the terminal may have data buffers of the respective layer, or may have an integrated buffer. In an embodiment of FIG. 6, the respective layers are described based on having data buffers, but the disclosure is not limited thereto. That is, the embodiments described with reference to FIG. 6 do not exclude an embodiment in which a terminal employs a physical integrated buffer and performs operations of the respective layers, and in this embodiment, the types of data of FIG. 6 may be distinguished as in FIG. 6. Further, although not illustrated in FIG. 6, an additional buffer may be included as well as the respective buffers of the three sub-layers.

The terminal may pre-generate headers in the respective layers according to processing performance, a protocol, or the like of the terminal. The above-described operations are referred to as "preprocessings of the respective layers". In some embodiments, the extent to which the terminal is to perform preprocessing may change according to implementation. In some other embodiments, information on a layer in which the terminal performs preprocessing, or the number of times of execution of preprocessing by the terminal may be pre-configured according to a standard. In still some other embodiments, a base station may notify the terminal of a layer in which the terminal performs preprocessing, or the number of times of execution of preprocessing by the terminal. For example, the base station may transmit information on preprocessing by the terminal to the terminal via RRC signaling, a Medium Access Control-Control Element (MAC-CE), or Downlink Control Information (DCI).

According to preprocessing, a protocol, or the like, the PDCP buffer 610 of the terminal may include a PDCP SDU having no header attached thereto (e.g., data 8 and data 9), and a PDCP PDU having a PDCP header attached thereto (data 6 and data 7). Although not illustrated in FIG. 6, according to various embodiments, a PDCP SDU may include an SDAP header. Further, according to various embodiments, a PDCP SDU may have the concept of including an SDAP SDU and an SDAP PDU. According to preprocessing, a protocol, or the like, the RLC buffer 620 of the terminal may include an RLC SDU having no RLC header attached thereto (data 5 and a PDCP header), and an RLC PDU having an RLC header attached thereto (data 3 and a PDCP header, and data 4 and a PDCP header). In this example, the RLC SDU has the same format as a PDCP PDU, but the RLC SDU and the PDCP PDU are described as having names distinguished according to layers. According to preprocessing, a protocol, or the like, the MAC buffer 630 of the terminal may include a MAC SDU having no MAC subheader attached thereto (data 2, a PDCP header, and an RLC header), and a MAC PDU having a MAC subheader attached thereto (data 1, a PDCP header, and an RLC header). In this example, the MAC SDU has the same format as an RLC PDU, but the MAC SDU and the RLC PDU are described as having names distinguished according to layers.

Figure 7:
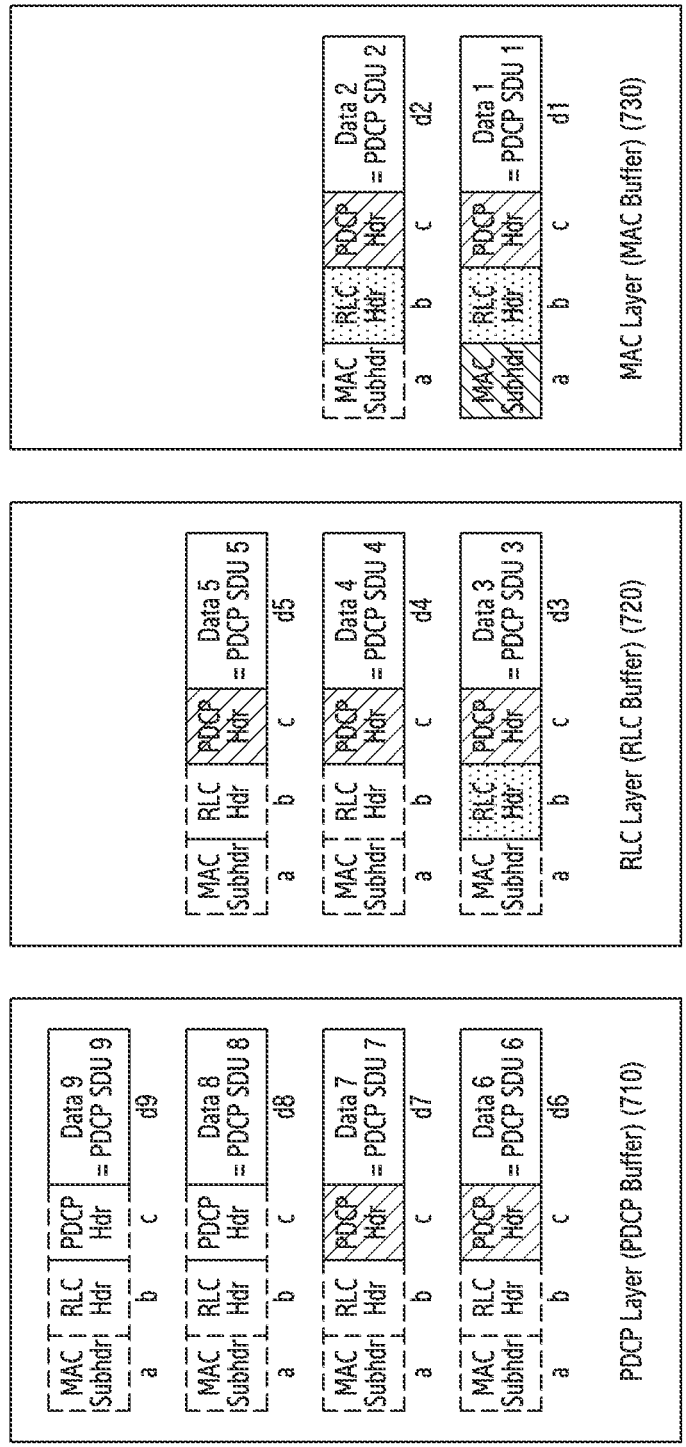
FIG. 7 illustrates an example of determination of a data volume according to various embodiments of the disclosure.

FIG. 7 illustrates an example of determination of a data volume according to various embodiments of the disclosure. The determination of a data volume may be determination of a data volume for buffer status reporting. For exact buffer status reporting, a terminal may determine a data volume according to various embodiments. The terminal is described as an example of the terminal 110 of FIG. 1. In this example, a data volume is the total amount of data available via logical channels, and may be referred to as a "buffer size".

Referring to FIG. 7, a buffer of the terminal may include a PDCP buffer 710, an RLC buffer 720, and a MAC buffer 730. As in FIG. 5, a MAC subheader, an RLC header, and a PDCP header are illustrated as having respective sizes of a, b, and c, and an n-th packet (e.g., a PDCP SDU or data) is illustrated as having a size of do (n represents a natural number). According to preprocessing, a protocol, or the like of the terminal, the respective buffers of the terminal may include various types of data. However, if whether the size of a header is included or not included in a data volume in each case is inconsistent, a base station may not accurately perform UL scheduling, that is, resource allocation for UL data of the terminal. Further, if the size of a header is not included in a data volume, this also causes the base station not to be able to accurately perform UL scheduling.

Accordingly, the disclosure proposes a method for including a size of a header, which is not yet generated, in a data volume according to data of a terminal. That is, when calculating a size of a buffer, the terminal may determine a data volume (a buffer size) in consideration of a size of a header which is not generated. In this example, the considered size of the header may include at least one of a representing a size of a MAC subheader, b representing a size of an RLC header, and c representing a size of a PDCP header. In other words, headers, the sizes of which are considered, may include all of a MAC subheader, an RLC header, and a PDCP header, or may include only some thereof according to an embodiment. However, various embodiments of the disclosure are characterized by including a particular header in a data volume equally for all packets. That is, when determining a data volume, the terminal may consider the same header with respect to all packets. For example, the terminal may transmit a BSR message by including a size of an RLC header and a size of a PDCP header in a data volume in relation to all data. Which header size is to be included in a data volume during transmission of a BSR message may be changed according to embodiments. For example, in the case of data 4 having only a PDCP header attached thereto in the RLC buffer 720, the terminal may calculate a data volume by adding b representing a size of an RLC header and a representing a size of a MAC subheader to d4 representing a size of a PDCP SDU and c representing a size of a PDCP header. This configuration implies that, although a header (e.g., a MAC subheader or an RLC header) is not yet generated, a data volume is determined to reflect a header of a fixed size. In the case of data 3 having a PDCP header and an RLC header attached thereto in the RLC buffer 720, the terminal may determine a data volume by further adding a representing a size of a MAC subheader to d3 representing a size of a PDCP SDU, c representing a size of a PDCP header, and b representing a size of an RLC header. The terminal may transmit a BSR depending on the determined data volume to the base station. In this example, a representing the size of the MAC subheader may be determined in consideration of a length of an L field generated with reference to a data volume obtained by adding b representing the size of the current RLC header, c representing the size of the PDCP header, and the corresponding data volume. The size of the RLC header may be determined as a size of an RLC header in a case where a packet is not segmented. In other words, the terminal may determine a data volume by using the size of the RLC header in the case where the packet is not segmented.

Figure 8:
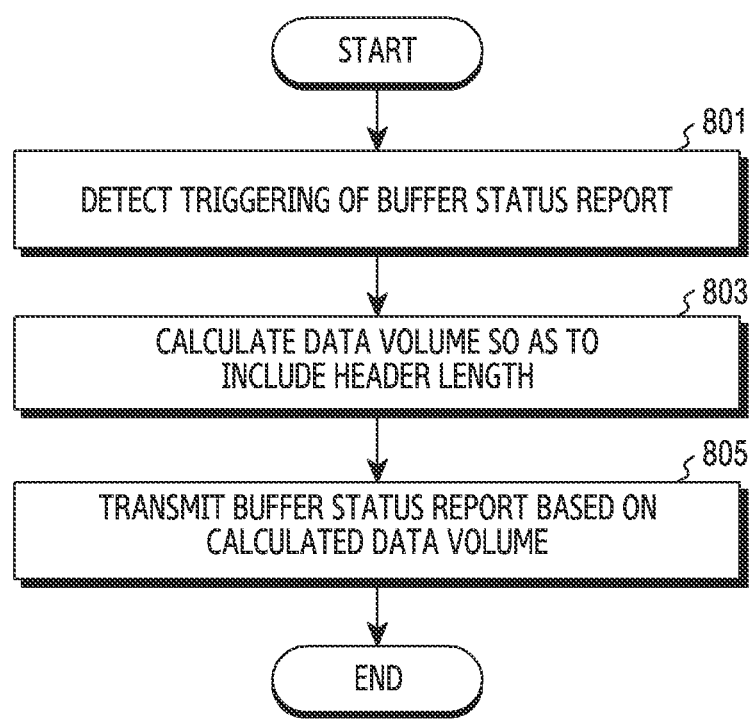
FIG. 8 illustrates a flow of operations of a terminal for a BSR depending on determination of a data volume according to various embodiments of the disclosure.

FIG. 8 illustrates a flow of operations of a terminal for a BSR depending on determination of a data volume according to various embodiments of the disclosure. The terminal is described as an example of the terminal 110 of FIG. 1.

Referring to FIG. 8, in operation 801, the terminal may detect triggering of a BSR. A BSR may be triggered according to a determined condition (e.g., occurrence of an event). The terminal may transmit a buffer status message to a base station according to a predetermined condition. A format of the message may be a format described below with reference to FIG. 16 or FIG. 18. A BSR message may include the amount of data which should be transmitted in a UL for each LCG.

In operation 803, the terminal may calculate a data volume so as to including a size (a length) of a header. A data volume may include a buffer size. When a BSR message is triggered, the terminal may calculate a data volume including a size of a header described in the embodiment of FIG. 7 according to various embodiments of the disclosure.

In operation 805, the terminal may transmit a BSR message to the base station based on the data volume calculated in operation 803. The terminal may generate a BSR message including a size of a header (e.g., an RLC header or a PDCP header). The terminal may transmit the generated BSR message to the base station.

Figure 9:
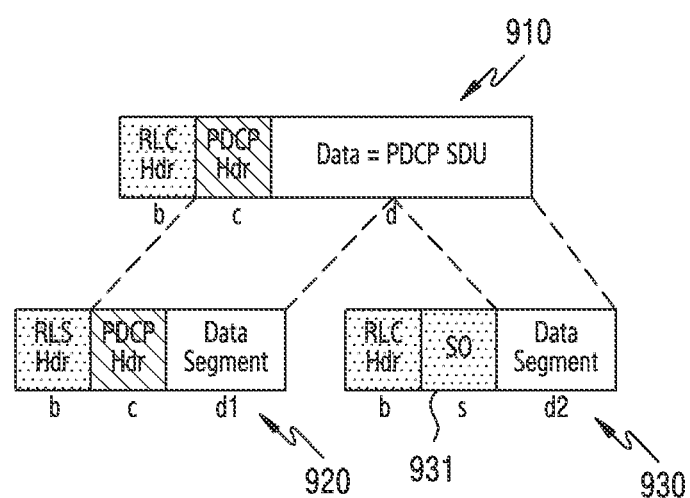
FIG. 9 illustrates an example of determination of a data volume during packet segmentation according to various embodiments of the disclosure.

FIG. 9 illustrates an example of determination of a data volume during packet segmentation according to various embodiments of the disclosure. Referring to FIG. 9, a description is made of a method for changing a data volume when a packet (e.g., data or a PDCP SDU) is segmented. A packet is segmented in an RLC layer in a wireless communication system, and segmentation is performed according to a size of a Transport Block (TB) in a MAC layer if necessary.

Referring to FIG. 9, a terminal may segment a packet 910 into a packet 920 and a packet 930. According to segmentation of the packet, a header may be added per packet. A segmentation scheme illustrated in FIG. 9 corresponds to SO segmentation, in which a Sequence Number (SN) of an RLC header is maintained and a SO field 931 is added, so as to allow the SO field to indicate an ordinal number of a byte, from which a corresponding data segment starts. In an embodiment of FIG. 9, the SO field 931 is assumed to have a size of s. A part corresponding to the SO field 931 may also be considered as a part of the RLC header. In this example, the RLC header of FIG. 9 may be considered as a part corresponding to an RLC header which does not include a SO field, and has a fixed size of b. When a packet is segmented, the RLC header having the size of b and the SO field having the size of s are additionally generated, and thus the terminal may calculate a data volume in consideration of the sizes (e.g., b representing the size of the RLC header and s representing the size of the SO field). Then, the terminal may calculate a data volume so that the data volume can also reflect a size of a MAC subheader needed for a second segment.

Figure 10:
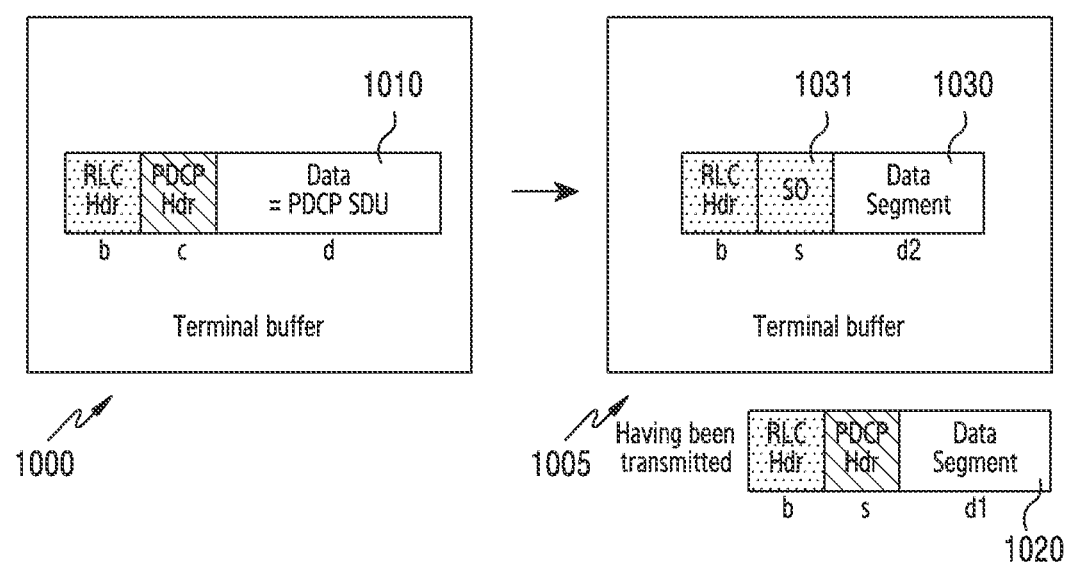
FIG. 10 illustrates an example of determination of a data volume during packet segmentation according to various embodiments of the disclosure.

FIG. 10 illustrates an example of determination of a data volume during packet segmentation according to various embodiments of the disclosure. Referring to FIG. 10, a description is made of detailed operations and configurations of changing a data volume when a packet (e.g., data or a PDCP SDU) is segmented. A packet is segmented in an RLC layer in a wireless communication system, and segmentation is performed according to a size of a TB in a MAC layer if necessary.

Referring to FIG. 10, the terminal may segment a packet 1010 into a packet 1020 and a packet 1030. A segmentation scheme illustrated in FIG. 10 corresponds to SO segmentation identically to the embodiment of FIG. 9, in which an SN of an RLC header is maintained and a SO field is added, so as to allow the SO field to indicate an ordinal number of a byte, from which a corresponding data segment starts. In an embodiment of FIG. 10, a SO field 1031 is assumed to have a size of s. A part corresponding to the SO field 1031 may also be considered as a part of the RLC header. In this example, the RLC header of FIG. 10 may be considered as a part corresponding to an RLC header which does not include a SO field, and has a fixed size of b. A packet may be segmented if the entire packet cannot be included in one TB.

A terminal buffer 1005 may include the packet 1010 before being segmented (as indicated by reference numeral 1000). In the embodiment of FIG. 10, the terminal buffer may include a remaining second segment including the packet 1030 after a first segment including the packet 1020 is transmitted (as indicated by reference numeral 1005). In relation to a size of the second segment, the segmented packet 1030 has a size of d2, an RLC header has a size of b, and a SO field has a size of s. In relation to a size of the first segment, the segmented packet 1020 has a size of d1, an RLC header has a size of b, and a PDCP header has a size of c. After the first segment is transmitted, the terminal updates d2 representing a size of the remaining data segment, a size of the remaining RLC header, and a size of the remaining SO field except for the sizes of the transmitted data segment and headers, and thus calculates a data volume. Then, the terminal may calculate a data volume so that the data volume can reflect a size of a MAC subheader needed for the second segment.

Figure 11:
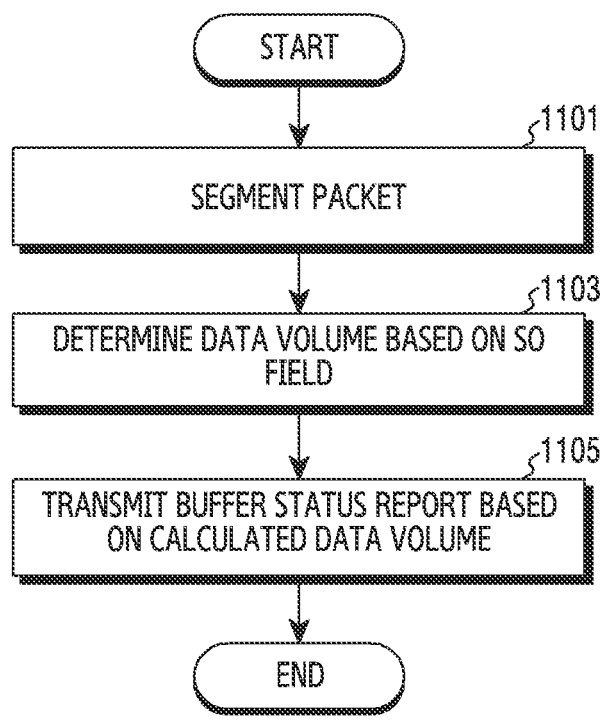
FIG. 11 illustrates a flow of operations of a terminal according to a change in a data volume during packet segmentation according to various embodiments of the disclosure.

FIG. 11 illustrates a flow of operations of a terminal according to a change in a data volume during packet segmentation according to various embodiments of the disclosure. The terminal is described as an example of the terminal 110 of FIG. 1. Referring to FIG. 11, a description is made of detailed operations of a terminal for a BSR including a changed data volume when a packet (e.g., data or a PDCP SDU) is segmented. FIG. 11 illustrates an order-related relationship of the packet segmentation described in the examples of FIG. 9 and FIG. 8.

Referring to FIG. 11, in operation 1101, the terminal may perform packet segmentation. Through packet segmentation, not only a header (e.g., an RLC header) but also a SO field may be added to a segmented packet.

In operation 1103, the terminal may determine a data volume based on the SO field. The terminal may update a data volume in response to addition of the SO field. When a packet is segmented, the terminal may update a data volume based on at least one of a size of the added SO field, a size of the added RLC header, and a size of a MAC header to be added.

In operation 1105, the terminal may transmit a BSR based on the calculated data volume. The terminal may generate a BSR message by using the data volume calculated after being updated. The terminal may transmit the generated BSR message to a base station.

Figure 12:
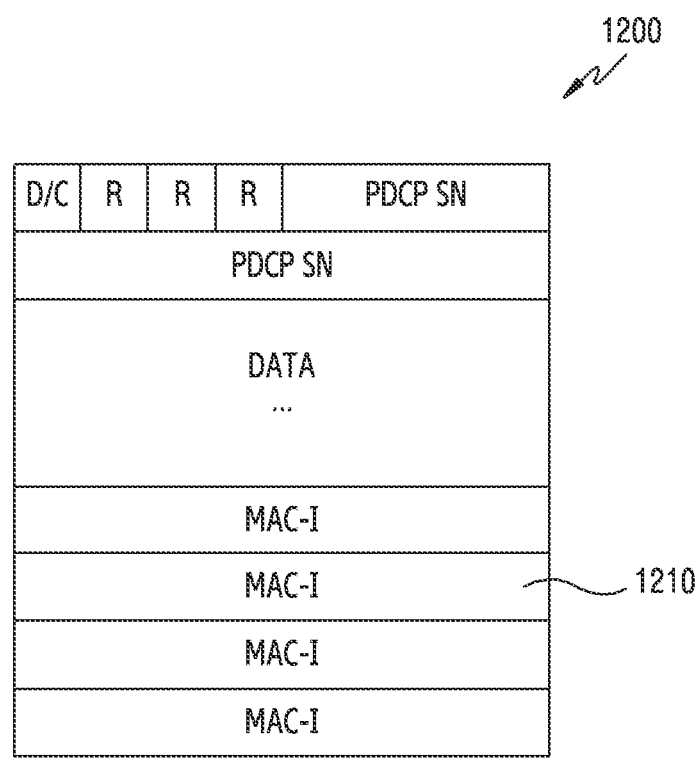
FIG. 12 illustrates an example of a format of a data Protocol Data Unit (PDU) of a Packet Data Convergence Protocol (PDCP).

FIG. 12 illustrates an example of a format of a data PDU of a PDCP.

Referring to FIG. 12, a PDU format 1200 may include a data part and a header part, and a header may include a D/C field, an R field, a PDCP SN field, and a Message Authentication Code for Integrity (MAC-I) field 1210. The D/C field indicates whether a corresponding PDU is a control PDU or a data PDU. If the D/C field has a value of D, the D/C field indicates a data PDU. If the D/C field has a value of C, the D/C field indicates a control PDU. The R field is a reserved field, and the PDCP SN field indicates a PDCP sequence number. Data may represent higher-layer data including a PDCP SDU. The MAC-I field 1210 is a code field generated for integrity check. In the case of a PDCP PDU which performs integrity protection, a terminal may calculate a MAC-I field by using an algorithm for generating a MAC-I. A receiver (a terminal or a base station) may determine whether a MAC-I field included in a PDCP PDU coincides with a MAC-I value calculated by the receiver, and thus may identify the integrity of transmitted data. Such a procedure for generating a MAC-I needs both a transmitter and a receiver (e.g., a terminal or a base station) to perform complicated calculation, and when integrity protection (e.g., protection of integrity of high-speed data) is applied to all packets, a processing speed of a transceiver may be reduced.

Figure 13:
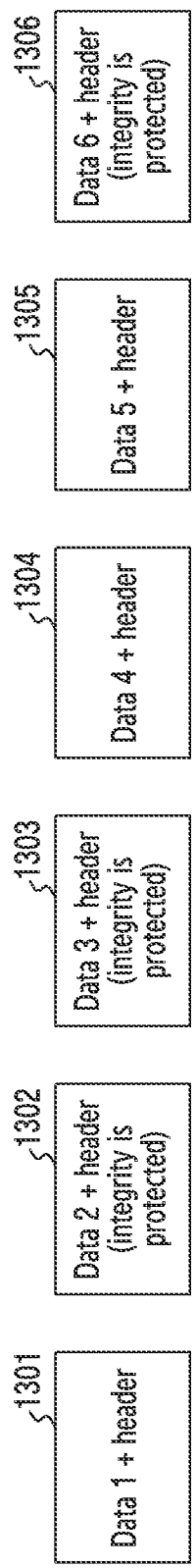
FIG. 13 illustrates an integrity protection scheme according to various embodiments of the disclosure.

FIG. 13 illustrates an integrity protection scheme according to various embodiments of the disclosure. According to embodiments, integrity protection of the disclosure may be applied between a base station and a terminal in a downlink (DL)/UL. The terminal is described as an example of the terminal 110 of FIG. 1, and the base station is described as an example of the base station 120 of FIG. 1.

Since execution of integrity protection for each packet (data) may cause concern about a reduction in a processing speed of a transceiver, the disclosure proposes an operation of performing integrity protection only for a particular packet. Execution of integrity protection may refer to calculation of a MAC-I. A packet for which integrity protection is not performed may not include a MAC-I field, or may include a MAC-I field having a predefined value (e.g., a constant value or a function value). Alternatively, a packet for which integrity protection is not performed may include a MAC-I field having an arbitrarily-configured random value. An operation/configuration for integrity protection, including for which type of packet integrity protection is or is not to be performed, which integrity protection is to be performed, and the like, may be configured according to a pre-agreed pattern, or may be configured according to a scheme described below with reference to FIG. 14 and FIG. 15.

Referring to FIG. 13, a transmission apparatus (e.g., a base station in a DL or a terminal in a UL) may perform integrity protection for data 2 1302, data 3 1303, and data 6 1306. The transmission apparatus may transmit the packets (data 2, data 3, and data 6) for which integrity protection has been performed. The transmission apparatus may not perform integrity protection for data 1 1301, data 4 1304, and data 5 1305. In this example, an aggressor may not recognize to which packet integrity protection has been applied, and thus it is possible to defend against a security attack through integrity protection according to the above-described scheme.

Figure 14:
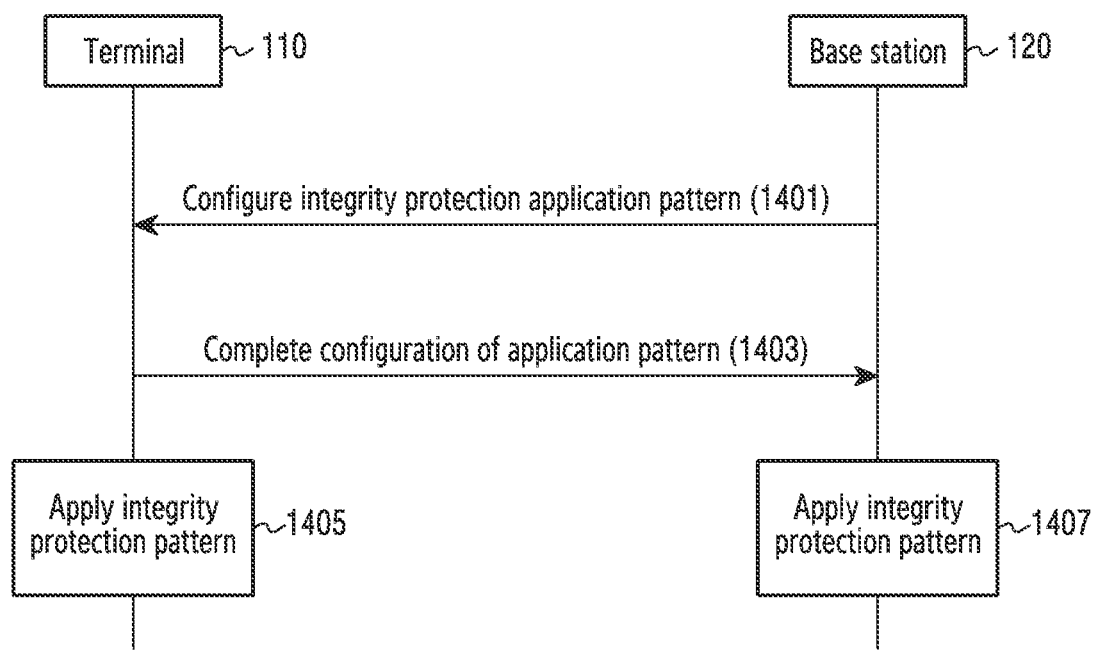
FIG. 14 illustrates an integrity protection procedure according to various embodiments of the disclosure.

FIG. 14 illustrates an integrity protection procedure according to various embodiments of the disclosure. As illustrated in FIG. 14, a terminal or a base station may configure integrity protection application pattern. The terminal is illustrated as an example of the terminal 110 of FIG. 1. The base station is illustrated as an example of the base station 120 of FIG. 1.

Referring to FIG. 14, in operation 1401, the base station may configure an integrity protection application pattern for the terminal According to various embodiments, an integrity protection application pattern may be configured when a radio bearer is set up or reconfigured. The base station may transmit an RRC message (e.g., an RRC connection reconfiguration message) by including information for configuration of an integrity protection application pattern (e.g., information which can be used to calculate an integrity protection application pattern) in the RRC message. In general, such a massage may be ciphered using security, and thus it may be difficult for an aggressor to acquire the message. In order to determine an integrity protection application pattern, as an example, the message may include an integrity protection application index. The terminal may calculate to which packet integrity protection is to be applied, by using an integrity protection application pattern algorithm described with reference to FIG. 15.

In operation 1403, the terminal may notify the base station that configuration of the integrity protection application pattern has been completed. In operation 1405, the terminal may receive the message, and may then apply the corresponding pattern. Similarly, in operation 1407, the base station may apply the integrity protection application pattern which is to be configured for the terminal.

FIG. 14 illustrates an example in which the terminal notifies the base station of completion of configuration of the integrity protection application pattern and then applies the integrity protection application pattern, but the disclosure is not limited thereto. For example, the terminal may: apply an integrity protection application pattern and then transmit, to the base station, a message including application of the corresponding pattern and completion of configuration of the same; or after the terminal configures an integrity protection application pattern and before the terminal applies the corresponding pattern, transmit, to the base station, a message including completion of configuration of the same.

Figure 15:
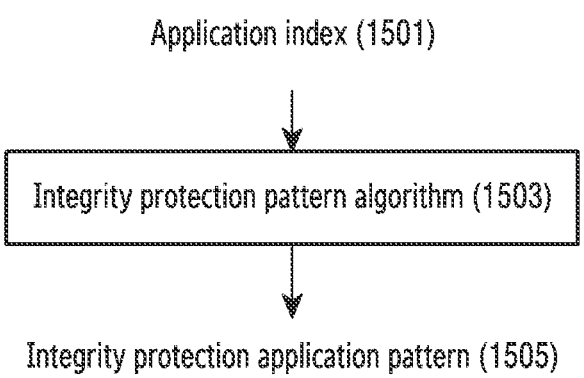
FIG. 15 illustrates an example of determination of an integrity protection application pattern according to various embodiments of the disclosure.

FIG. 15 illustrates an example of determination of an integrity protection application pattern according to various embodiments of the disclosure.

Referring to FIG. 15, the integrity protection application pattern 1505 may be acquired as a result obtained by substituting an integrity protection application index 1501 into an algorithm 1503. For example, an integrity protection application pattern applied to a corresponding packet may be acquired based on a pseudo random number according to an index. The acquired integrity protection application pattern allows integrity protection to be applied to only a particular packet.

Figure 16:
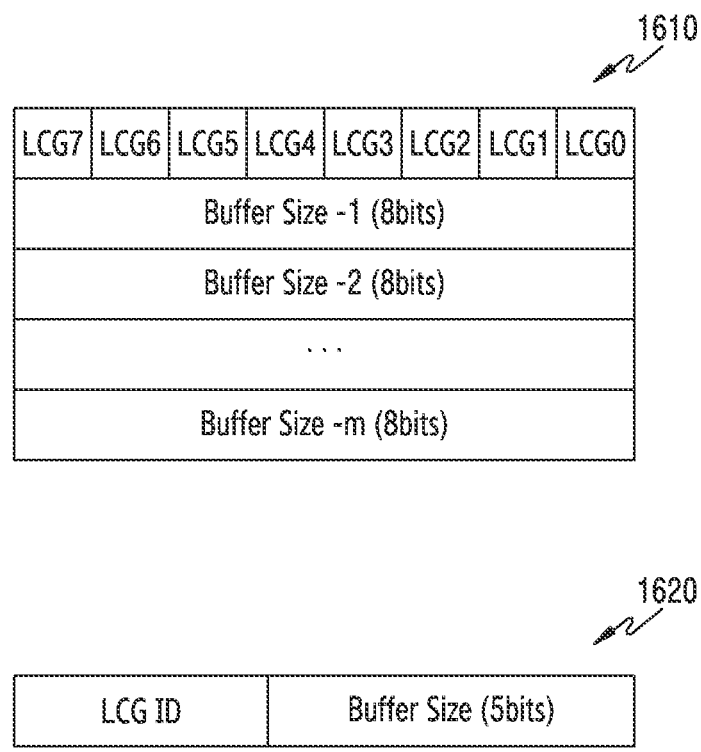
FIG. 16 illustrates an example of a format of a BSR message according to various embodiments of the disclosure.

FIG. 16 illustrates an example of a format of a BSR message according to various embodiments of the disclosure.

Referring to FIG. 16, a first format 1610 refers to a long BSR format among BSRs. A long BSR is configured to report a buffer status of an LCG in which data is remained in one or more buffers. The long BSR includes a front 8-bit bitmap and buffer size fields which are consecutive after the bitmap. LCG0 to LCG7 are a bitmap indicating whether a buffer size of a corresponding LCG is reported. If a corresponding bit of the bitmap is 0, this indicates that a buffer size of a corresponding LCG is not reported, and if the corresponding bit of the bitmap is 1, this indicates that the buffer size of the corresponding LCG is reported. The buffer size fields each having eight bits may indicate buffer sizes through 256 steps. The buffer size fields indicate buffer sizes in ascending order of LCGs, values of which are set to 1's in the bitmap. Since a value of the bitmap represents the size of the entire long BSR, a MAC subheader of the message may not include an L field.

A second format 1620 refers to a short BSR format among BSRs. A short BSR is configured to report a buffer status of one LCG. The short BSR includes a 3-bit LCG ID and a buffer size field which has five bits and indicates buffer sizes of 32 steps. When to use a long BSR and when to use a short BSR may be determined according to the conditions described below with reference to FIG. 17 to FIG. 22. BSRs may be classified into a regular BSR, a periodic BSR, a padding BSR, and the like according to a scheme for triggering a BSR. A padding BSR may refer to a BSR for providing information which is helpful for scheduling instead of padding needed for the size of a scheduled TB.

Figure 17:
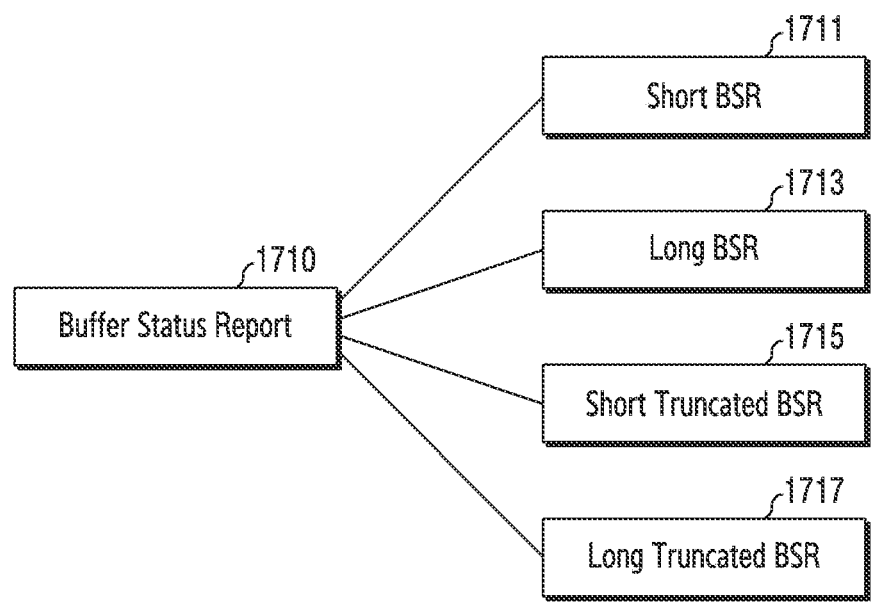
FIG. 17 illustrates an example of classification of BSR messages according to various embodiments of the disclosure.

FIG. 17 illustrates an example of classification of BSR messages according to various embodiments of the disclosure. As described with reference to FIG. 16, the BSR formats may be classified into a short BSR and a long BSR. In addition, according to the integrity of information included in a BSR, short BSRs may be classified into a general short BSR and a short truncated BSR. Similarly, long BSRs may be classified into a general long BSR and a long truncated BSR. A general short BSR and a short truncated BSR may use a short BSR format corresponding to the second format 1620, and a general long BSR and a long truncated BSR may use a long BSR format corresponding to the first format 1610. A general short/long BSR and a short/long truncated BSR are distinguished according to the integrity of information, and when buffer sizes of all LCGs including data are reported in a BSR, the corresponding BSR may be classified as a general short/long BSR. In contrast, if an LCG fails to be included in a corresponding BSR although the LCG includes data (i.e., the LCG fails to be reported in the corresponding BSR), the BSR may be classified as a short/long truncated BSR. LCGs reported in a truncated BSR may have the highest priority among the LCGs including data.

In another embodiment, when an LCG fails to be included in a corresponding BSR although the LCG includes data, or when there is an LCG, the exact buffer status of which has not been reported, the corresponding BSR may be classified as a short/long truncated BSR. For example, when, although a buffer size is reported in a short BSR format, a value of the reported buffer size is larger than or equal to a first threshold, a corresponding BSR may be classified as a short truncated BSR. In this example, the first threshold may be an upper bound of an index having the highest upper bound among indices indicating a range having an upper bound. For example, the first threshold may be an index #30 of a buffer size level of a 5-bit buffer size field, that is, an upper bound of an index having the highest upper bound among the indices having an upper bound. As an example, if a buffer size value of an index #30 of a buffer size level of a 5-bit buffer size field exceeds 100 bytes and is smaller than or equal to 150 bytes, the first threshold may be 150 bytes which is the value of the upper bound. Hereinafter, according to embodiments, a general short BSR may refer to a short BSR, and a general long BSR may refer to a long BSR.

Figure 18:
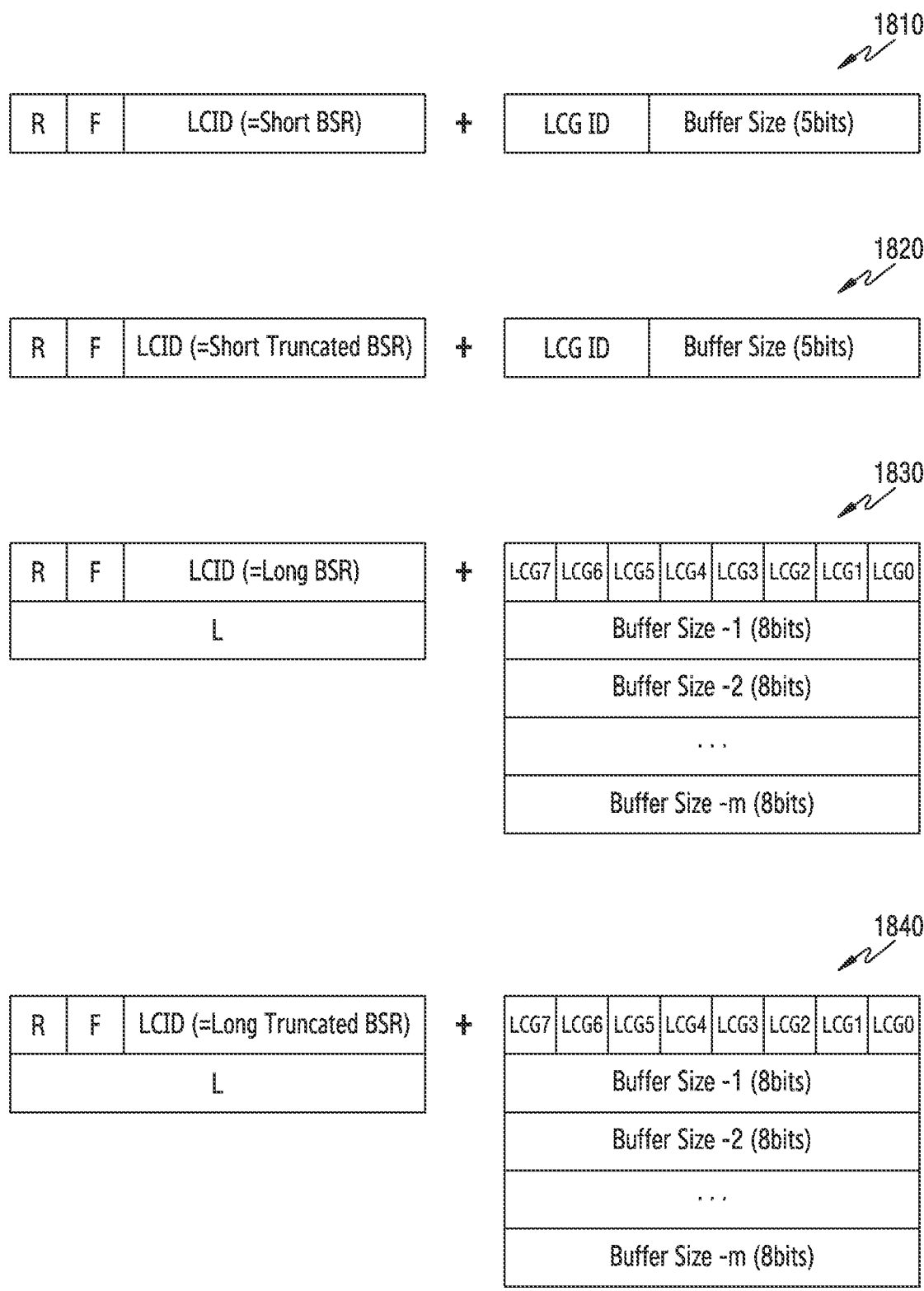
FIG. 18 illustrates an example of a combination of a BSR message and a MAC subheader of the corresponding message according to various embodiments.

FIG. 18 illustrates an example of a combination of a BSR message and a MAC subheader of the corresponding message according to various embodiments.

Referring to FIG. 18, a BSR message 1710 may include four types of BSRs, that is, a short BSR 1711, a long BSR 1713, a short truncated BSR 1715, and a long truncated BSR 1717, which have been described with reference to FIG. 17. The respective types of BSRs may be distinguished according to values representing types corresponding to the respective BSRs in a Logical Channel ID (LCID) field.

Each of a short BSR in a first combination 1810 and a short truncated BSR in a second combination 1820 is a message of a fixed length, that is, a MAC-CE of a fixed length, and thus does not include an L field. Each of a long BSR in a third combination 1830 and a long truncated BSR in a fourth combination 1840 is a message of a variable length, that is, a MAC-CE of a variable length, and thus may include an L field. However, the value of the bitmap represents the size of the entire BSR as described with reference to FIG. 16, and thus a MAC subheader of a message may not include an L field according to embodiments. In other words, whether to include an L field does not limit the scope of embodiments of the disclosure.

Figure 19:
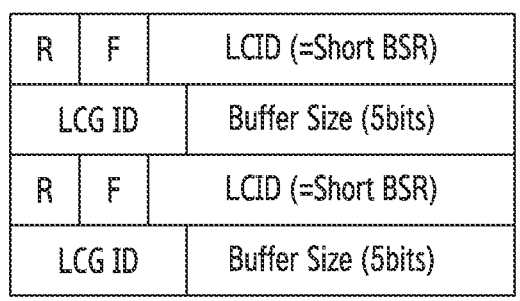
FIG. 19 illustrates an example of a scheme for transmission of a BSR according to various embodiments of the disclosure.

FIG. 19 illustrates an example of a scheme for transmission of a BSR according to various embodiments of the disclosure.

Referring to FIG. 19, in an embodiment of FIG. 19, a description is made of a configuration in which two short BSRs (e.g., the short BSR illustrated in FIG. 18) are transmitted by being included in one-time TB. A terminal may transmit a BSR message 1950 including two short BSRs. According to various embodiments, the terminal may transmit a BSR message including two short truncated BSRs.

The long BSR or the long truncated BSR in the third combination 1830 and the fourth combination 1840 which are illustrated in FIG. 18 needs at least four bytes, including one MAC subheader, as long as an L field is not omitted, and may transmit only a buffer size of one LCG by using the four bytes. However, even when each of a short BSR and a short truncated BSR has two bytes, including a MAC subheader, each of the short BSR and the short truncated BSR may transmit a buffer size of one LCG. Accordingly, each of the short BSR and the short truncated BSR may transmit buffer sizes of two LCGs by using four bytes. Therefore, when the terminal needs to transmit buffer sizes of two LCGs, the terminal may group two short BSRs or two short truncated BSRs, rather than a long BSR or a long truncated BSR, and may transmit the same.

In some embodiments, when there are two LCGs including data and buffer sizes of two LCGs to be reported are all smaller than or equal to a first threshold, the terminal may simultaneously transmit such two short BSRs. For example, the first threshold may be an index #30 of a buffer size level of a 5-bit buffer size field, that is, an upper bound of an index having the highest upper bound among the indices having an upper bound. As an example, if a buffer size value of an index #30 of a buffer size level of a 5-bit (e.g., indices are numbered from 0 to 31) buffer size field exceeds 100 bytes and is smaller than or equal to 150 bytes, the first threshold may be 150 bytes which is the value of the upper bound.

In some other embodiments, when there are at least two LCGs including data and buffer sizes of two LCGs, which have higher priorities and are to be reported, are all smaller than or equal to a first threshold, if the size of padding is four bytes, the terminal may simultaneously transmit such two short truncated BSRs. For example, the first threshold may be an index #30 of a buffer size level of a 5-bit buffer size field, that is, an upper bound of an index having the highest upper bound among the indices having an upper bound. As an example, if a buffer size value of an index #30 of a buffer size level of a 5-bit buffer size field exceeds 100 bytes and is smaller than or equal to 150 bytes, the first threshold may be 150 bytes which is the value of the upper bound.

Figure 20A:
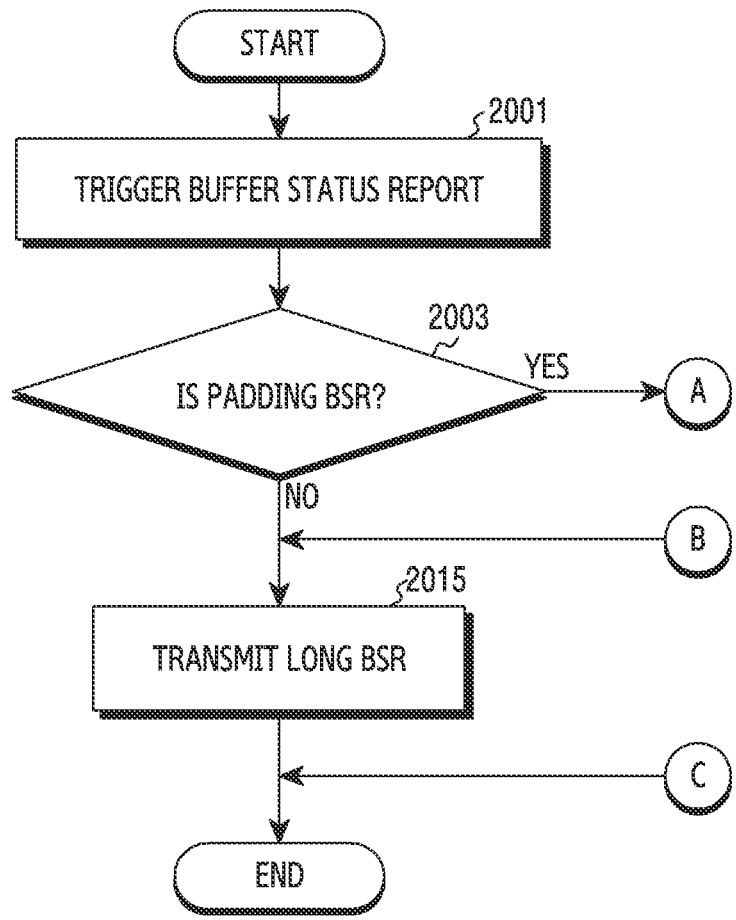
FIG. 20A and FIG. 20B illustrate an embodiment for transmission of a BSR according to various embodiments.
Figure 20B:
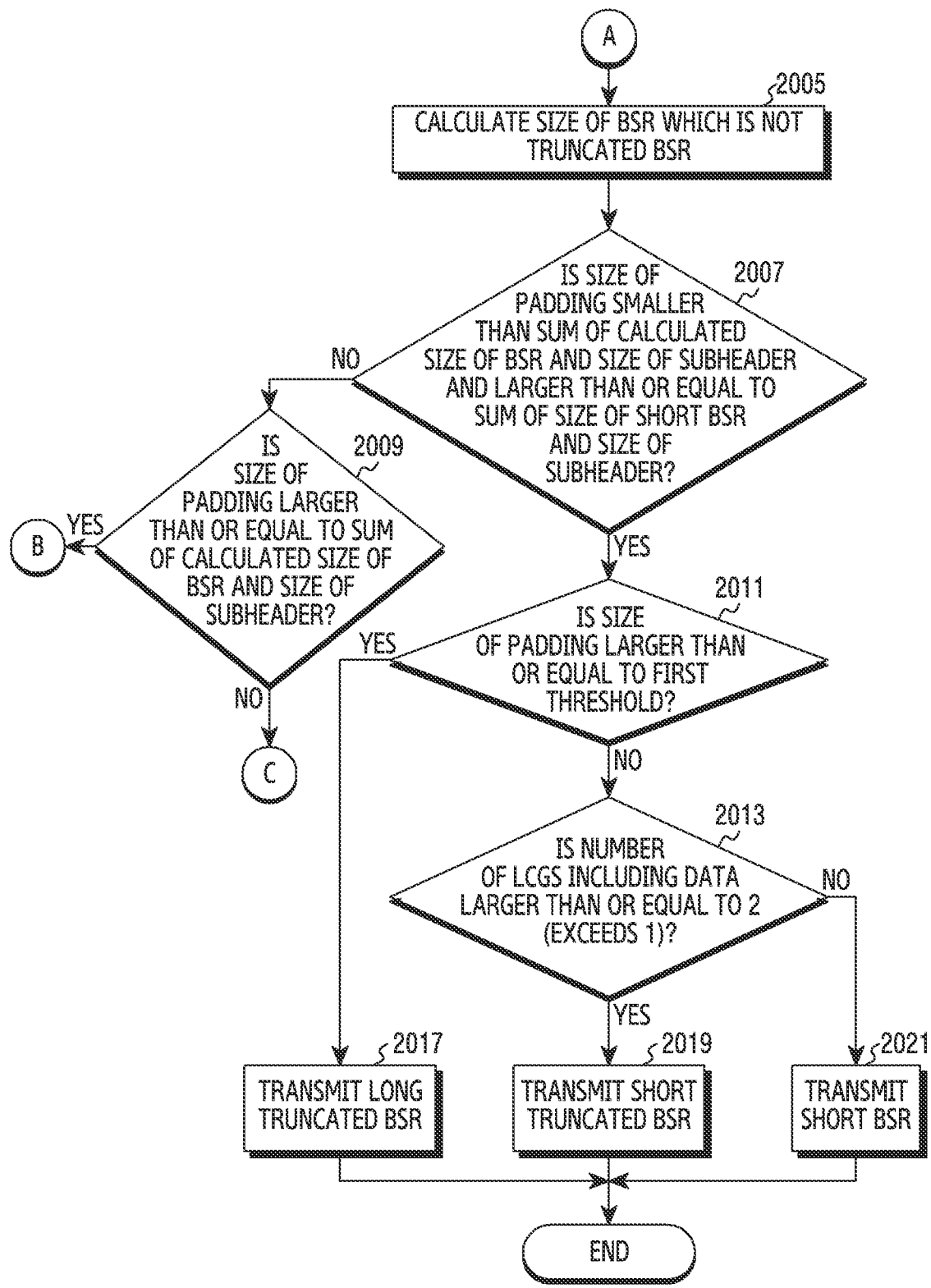

FIG. 20A and FIG. 20B illustrate an embodiment for transmission of a BSR according to various embodiments. A terminal is described as an example of the terminal 110 of FIG. 1.

Referring to FIG. 20A and FIG. 20B, after a BSR is triggered in operation 2001, in operation 2003, the terminal may determine whether the BSR is a padding BSR. If the BSR is not a padding BSR (e.g., the BSR is a regular/periodic BSR), in operation 2015, the terminal may transmit a BSR, a format of which is a long BSR. If the BSR is a padding BSR, in operation 2005, the terminal may calculate a size of a BSR which is not a truncated BSR, and may compare the calculated size with a size of padding. The BSR, the size of which is calculated in operation 2005, has a long BSR format used to transmit a regular BSR or a periodic BSR, and the calculated size of the BSR may be calculated as a size of a BSR capable of including a buffer size of an LCG including data. In this example, a criterion for the buffer size may correspond to either an amount of data which remains in a buffer after a time point of generation of a BSR, or an amount of data which remains in the buffer after a corresponding time unit.

In operation 2007, the terminal may determine whether the size of the padding is smaller than a sum of the calculated size of the BSR and a size of a subheader and is larger than or equal to a sum of a size of a short BSR and a size of a subheader. If the size of the padding is smaller than a sum of the calculated size of the BSR and a size of a subheader and is larger than or equal to a sum of a size of a short BSR and a size of a subheader, the corresponding padding may not include a long BSR. In this example, in operation 2011, the terminal may determine whether the size of the padding is larger than or equal to a first threshold. If the size of the padding is larger than or equal to the pre-configured first threshold, in operation 2017, the terminal may use a long truncated BSR. In this example, the first threshold may refer to a minimum size which can be used to transmit a long truncated BSR, and may be four bytes if an L field needs to be included in a MAC subheader of a long truncated BSR, or may be three bytes if the L field is not included in the MAC subheader of the long truncated BSR. If the size of the padding is smaller than the first threshold, the terminal may transmit a BSR only in a short BSR format. In operation 2013, the terminal may determine whether the number of LCGs including data is larger than or equal to 2. If the number of LCGs including data is larger than or equal to 2, the terminal may transmit a BSR only in a short truncated BSR format. If the number of LCGs including data is larger than or equal to 2, in operation 2019, the terminal may transmit a BSR, the format of which is a short truncated BSR. If the number of LCGs including data is equal to 1, in operation 2021, the terminal may transmit a BSR, the format of which is a short BSR. When the short BSR is not defined, the terminal may transmit a BSR, the format of which is a short truncated BSR. According to various embodiments, in the embodiments of FIG. 20A and FIG. 20B, the short truncated BSR and the short BSR may not be distinguished from each other.

If the size of the padding is larger than a sum of the calculated size of the BSR and a size of a subheader and is smaller than a sum of a size of a short BSR and a size of a subheader, the corresponding padding may not include a truncated BSR. In this example, in operation 2009, the terminal may determine whether the size of the padding is larger than or equal to the sum of the calculated size of the BSR and the size of the subheader. If the size of the padding is larger than the sum of the calculated size of the BSR and the size of the subheader, in operation 2015, the terminal may transmit a BSR, the format of which is a long BSR. If the size of the padding is smaller than or equal to the sum of the calculated size of the BSR and the size of the subheader, in operation 2017, the terminal may not transmit any BSR. As described above with reference to FIG. 18, the sum of a size of a short BSR and a size of a subheader may be two bytes.

In the embodiments of FIG. 20A and FIG. 20B, a buffer status of the terminal may be completely reported in only a long BSR, and thus the terminal may start a periodicBSR-Timer only when the terminal transmits a long BSR. However, according to various embodiments, the terminal may be configured to start a periodicBSR-Timer when the terminal transmits a long BSR or a short BSR.

Figure 21A:
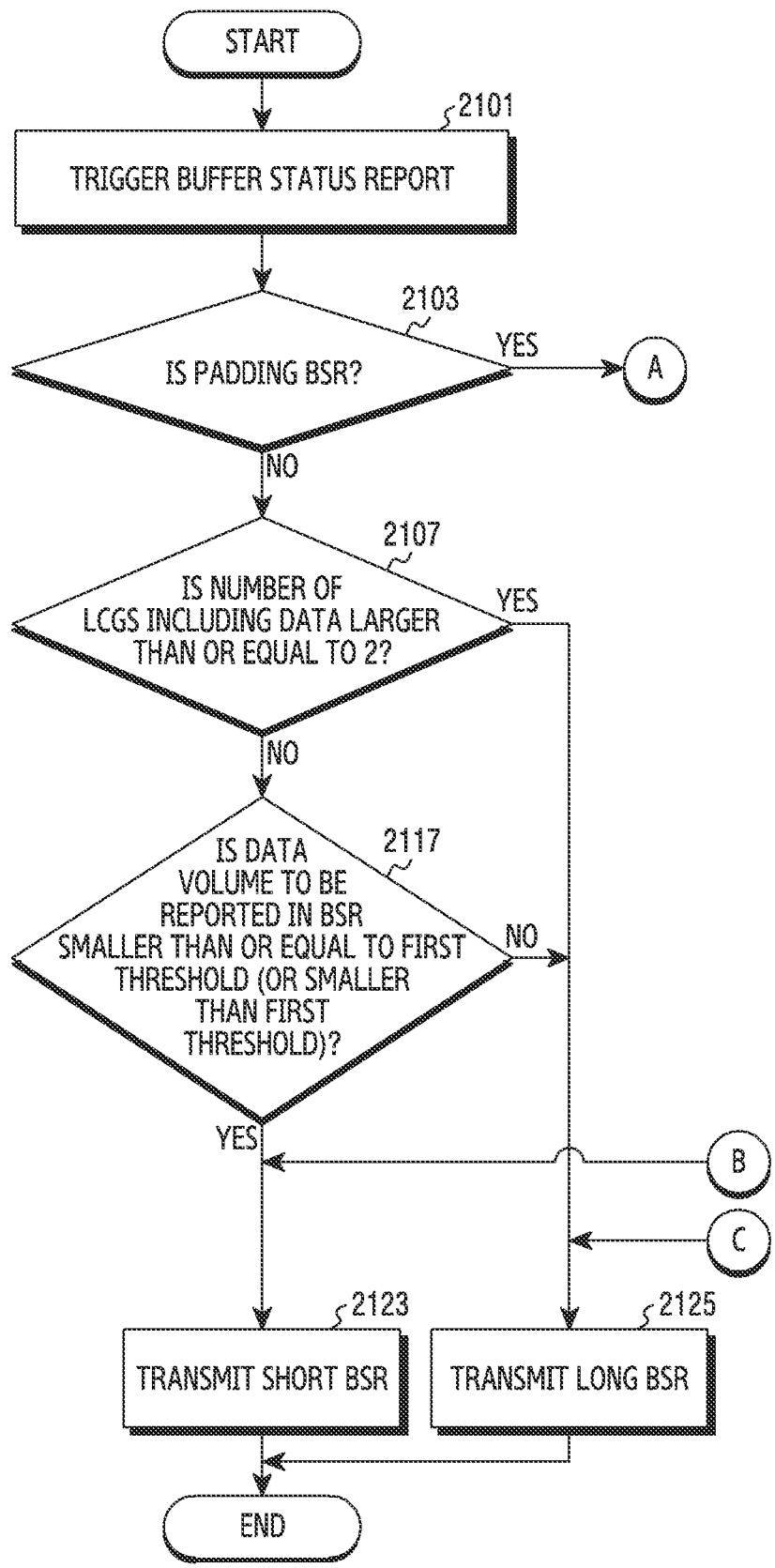
FIG. 21A and FIG. 21B illustrate another embodiment for transmission of a BSR according to various embodiments.
Figure 21B:
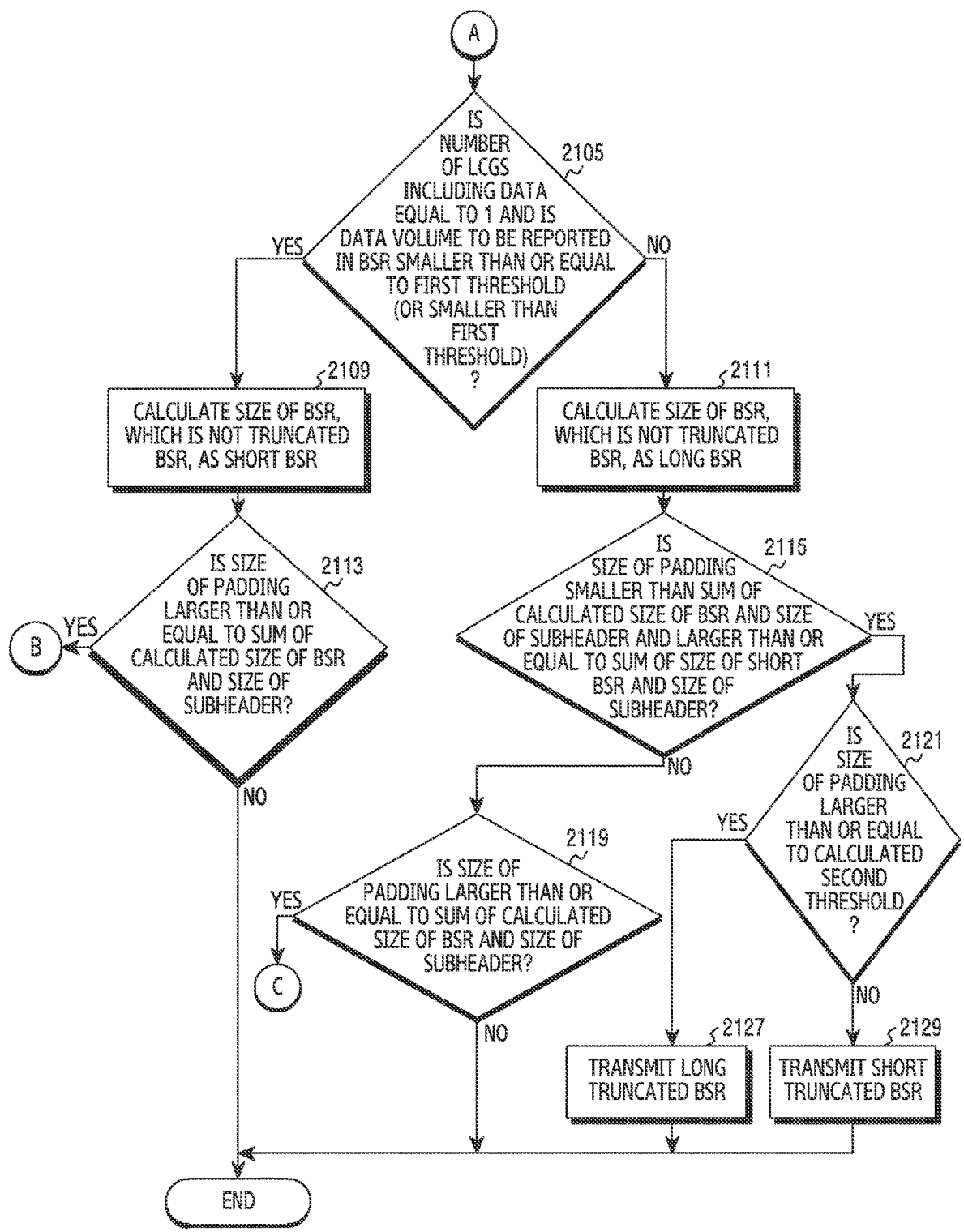

FIG. 21A and FIG. 21B illustrate another embodiment for transmission of a BSR according to various embodiments. A terminal may transmit a BSR. The terminal is described as an example of the terminal 110 of FIG. 1. FIG. 21A and FIG. 21B illustrate the embodiment for transmission of a BSR.

Referring to FIG. 21A and FIG. 21B, after a BSR is triggered in operation 2101, in operation 2103, the terminal may determine whether the BSR is a padding BSR. If the BSR is not a padding BSR (e.g., the BSR is a regular/periodic BSR), in operation 2107, the terminal may determine a BSR format to be used, according to the number of LCGs including data and a size of data to be reported. If the number of LCGs including data is equal to 1 (is smaller than 2, and if the number of the LCGs is 0, this may not be reported) and a data volume to be reported in the BSR is smaller than or equal to a first threshold (or is smaller than the first threshold) in operation 2117, in operation 2123, the terminal transmits a BSR, the format of which is a short BSR. For example, the first threshold may be an index #30 of a buffer size level of a 5-bit buffer size field, that is, an upper bound of an index having the highest upper bound among the indices having an upper bound. As an example, if a buffer size value of an index #30 of a buffer size level of a 5-bit buffer size field exceeds 100 bytes and is smaller than or equal to 150 bytes, the first threshold may be 150 bytes which is the value of the upper bound. In contrast, if the number of LCGs including data is larger than or equal to 2, or if the number of LCGs including data is equal to 1 but a data volume to be reported in the BSR exceeds the first threshold, in operation 2125, the terminal may transmit a BSR by using a long BSR format.

If the BSR is a padding BSR, in operation 2105, the terminal may determine whether the number of LCGs including data is equal to 1 and a data volume to be reported in the BSR is smaller than or equal to the first threshold (or is smaller than the first threshold). If the number of LCGs including data is equal to 1 and the data volume to be reported in the BSR is smaller than or equal to the first threshold (or is smaller than the first threshold), in operation 2109, the terminal may calculate a size of a BSR, which is not a truncated BSR, as a short BSR. In this example, the corresponding size may be one byte as described with reference to FIG. 18. In this example, if a size of padding is larger than or equal to a sum (i.e., two bytes) of the calculated size of the BSR and a size of a subheader in operation 2113, in operation 2123, the terminal may transmit a BSR, the format of which is a short BSR. However, if the size of the padding is smaller than two bytes, the terminal may not transmit a BSR.

If the BSR is a padding BSR and the number of LCGs including data is larger than or equal to 2, or if the number of LCGs including data is equal to 1 and the data volume to be reported in the BSR exceeds the first threshold (or is larger than or equal to the first threshold), in operation 2111, the terminal may calculate a size of a BSR, which is not a truncated BSR, as a long BSR. The BSR, the size of which is calculated in operation 2111, has a long BSR format used to transmit a regular BSR or a periodic BSR, and the calculated size may be calculated as a size of a BSR capable of including a buffer size of an LCG including data. In this example, a criterion for the buffer size may correspond to either an amount of data which remains in a buffer after a time point of generation of a BSR, or an amount of data which remains in the buffer after a corresponding time unit. If the size of the padding is larger than or equal to the sum of the calculated size of the BSR and the size of the subheader in operation 2119, in operation 2125, the terminal may transmit a BSR, the format of which is a long BSR. If the size of the padding is smaller than a sum (i.e., two bytes) of a size of a short BSR and a size of a subheader, the terminal may not transmit a BSR. If the size of the padding is smaller than the sum of the calculated size of the BSR and the size of the subheader and is larger than or equal to a sum of a size of a short BSR and a size of a subheader, the terminal should transmit a BSR, the format of which is a truncated BSR. In this example, in operation 2121, the terminal may determine whether the size of the padding is larger than or equal to a calculated second threshold. If the size of the padding is larger than or equal to the calculated second threshold, in operation 2127, the terminal transmits a BSR, the format of which is a long truncated BSR. If the size of the padding is smaller than the second threshold, in operation 2129, the terminal transmits a BSR, the format of which is a short truncated BSR. In this example, the second threshold may refer to a minimum size which can be used to transmit a long truncated BSR, and may be four bytes if an L field needs to be included in a MAC subheader of a long truncated BSR, or may be three bytes if the L field is not included in the MAC subheader of the long truncated BSR.

In the embodiments of FIG. 21A and FIG. 21B, the terminal may be configured to start a periodicBSR-Timer when the terminal transmits a long BSR or a short BSR.

Figure 22A:
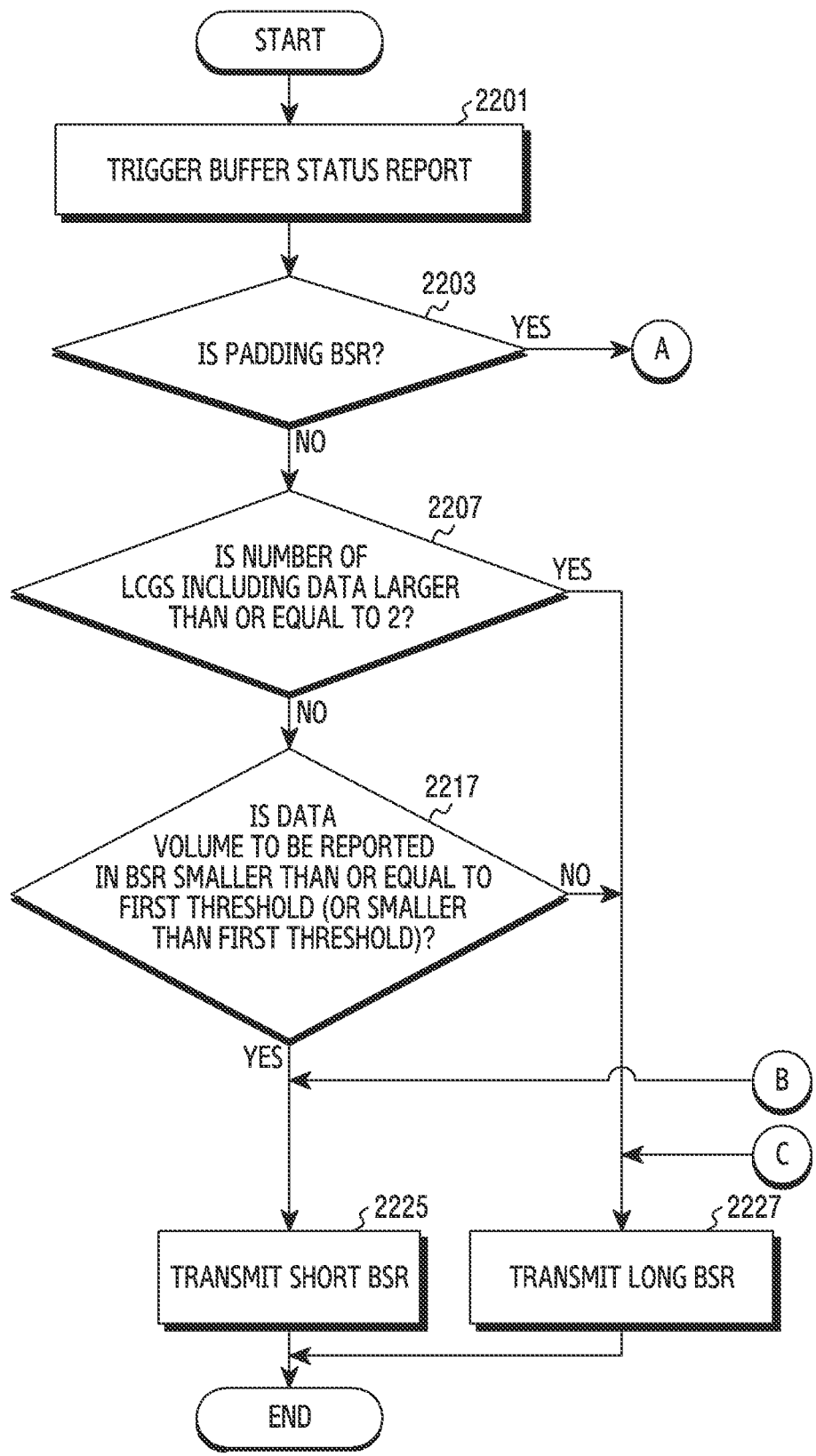
FIG. 22A and FIG. 22B illustrate still another embodiment for transmission of a BSR according to various embodiments.
Figure 22B:
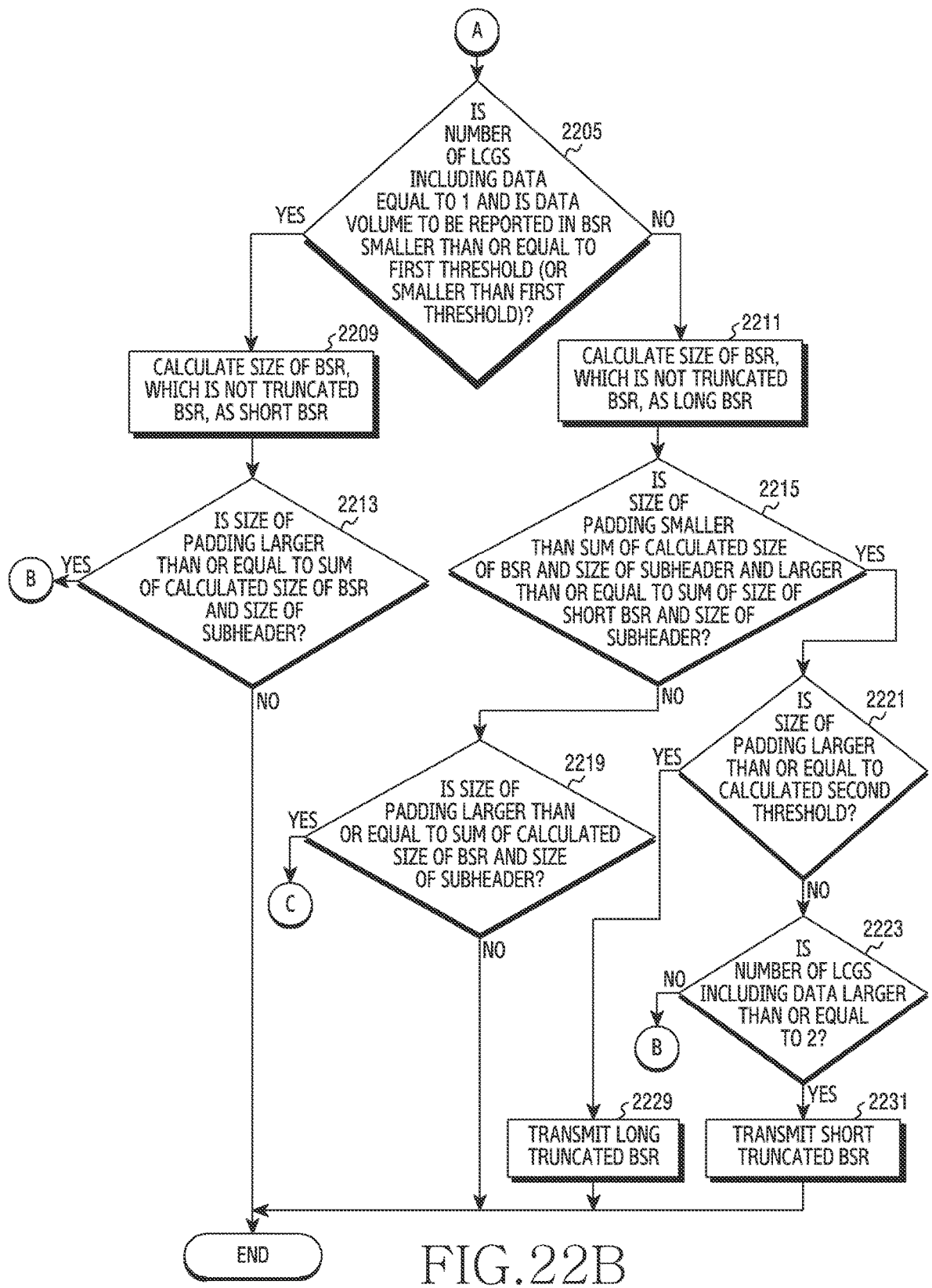

FIG. 22A and FIG. 22B illustrate still another embodiment for transmission of a BSR according to various embodiments. A terminal may transmit a BSR. The terminal is described as an example of the terminal 110 of FIG. 1. FIG. 22A and FIG. 22B illustrate an embodiment for transmission of a BSR.

Referring to FIG. 22A and FIG. 22B, after a BSR is triggered in operation 2201, in operation 2203, the terminal may determine whether the BSR is a padding BSR. If the BSR is not a padding BSR (e.g., the BSR is a regular/periodic BSR), in operation 2207, the terminal may determine the number of LCGs including data and a BSR format to be used according to a data volume to be reported. If the number of LCGs including data is equal to 1 (is smaller than 2, and if the number of the LCGs is 0, this may not be reported) and a data volume to be reported in the BSR is smaller than or equal to a first threshold (or is smaller than the first threshold) in operation 2217, in operation 2225, the terminal transmits a BSR, the format of which is a short BSR. For example, the first threshold may be an index #30 of a buffer size level of a 5-bit buffer size field, that is, an upper bound of an index having the highest upper bound among the indices having an upper bound. As an example, if a buffer size value of an index #30 of a buffer size level of a 5-bit buffer size field exceeds 100 bytes and is smaller than or equal to 150 bytes, the first threshold may be 150 bytes which is the value of the upper bound. In contrast, if the number of LCGs including data is larger than or equal to 2, or if the number of LCGs including data is equal to 1 but a data volume to be reported in the BSR exceeds the first threshold, in operation 2227, the terminal may transmit a BSR by using a long BSR format.

If the BSR is a padding BSR, in operation 2205, the terminal may determine whether the number of LCGs including data is equal to 1 and a data volume to be reported in the BSR is smaller than or equal to the first threshold (or is smaller than the first threshold). If the number of LCGs including data is equal to 1 and the data volume to be reported in the BSR is smaller than or equal to the first threshold (or is smaller than the first threshold), in operation 2209, the terminal may calculate a size of a BSR, which is not a truncated BSR, as a short BSR. In this example, the corresponding size may be one byte as described with reference to FIG. 18. In this example, if a size of padding is larger than or equal to a sum (i.e., two bytes) of the calculated size of the BSR and a size of a subheader in operation 2213, in operation 2125, the terminal may transmit a BSR, the format of which is a short BSR. However, if the size of the padding is smaller than two bytes, the terminal may not transmit a BSR.

If the BSR is a padding BSR and the number of LCGs including data is larger than or equal to 2, or if the number of LCGs including data is equal to 1 and the data volume to be reported in the BSR exceeds the first threshold (or is larger than or equal to the first threshold), in operation 2211, the terminal may calculate a size of a BSR, which is not a truncated BSR, as a long BSR. The BSR, the size of which is calculated in operation 2211, has a long BSR format used to transmit a regular BSR or a periodic BSR, and the calculated size may be calculated as a size of a BSR capable of including a buffer size of an LCG including data. In this example, a criterion for the buffer size may correspond to either an amount of data which remains in a buffer after a time point of generation of a BSR, or an amount of data which remains in the buffer after a corresponding time unit. If the size of the padding is larger than or equal to the sum of the calculated size of the BSR and the size of the subheader in operation 2219, in operation 2227, the terminal may transmit a BSR, the format of which is a long BSR. If the size of the padding is smaller than a sum (i.e., two bytes) of a size of a short BSR and a size of a subheader, the terminal may not transmit a BSR. If the size of the padding is smaller than the sum of the calculated size of the BSR and the size of the subheader and is larger than or equal to a sum of a size of a short BSR and a size of a subheader, the terminal should transmit a BSR, the format of which is a truncated BSR. In this example, in operation 2221, the terminal may determine whether the size of the padding is larger than or equal to a calculated second threshold. If the size of the padding is larger than or equal to the calculated second threshold, in operation 2229, the terminal may transmit a BSR, the format of which is a long truncated BSR. If the size of the padding is smaller than the second threshold, in operation 2231, the terminal transmits a BSR, the format of which is a short BSR or a short truncated BSR. Compared with FIG. 21A and FIG. 21B, in operation 2223, the terminal may additionally determine whether the number of LCGs including data is larger than or equal to 2. If the number of LCGs including data is larger than or equal to 2, in operation 2231, the terminal may transmit a BSR, the format of which is a short truncated BSR. If the number of LCGs including data is smaller than 2 or is equal to 1, in operation 2225, the terminal may transmit a BSR, the format of which is a short BSR. In this example, the second threshold may refer to a minimum size which can be used to transmit a long truncated BSR, and may be four bytes if an L field needs to be included in a MAC subheader of a long truncated BSR, or may be three bytes if the L field is not included in the MAC subheader of the long truncated BSR.

In the embodiments of FIG. 22A and FIG. 22B, the terminal may be configured to start a periodicBSR-Timer when the terminal transmits a long BSR or a short BSR. According to embodiments, the terminal may also be configured to start a periodicBSR-Timer only for a long BSR.

In the disclosure, in order to determine whether a particular condition is fulfilled, the expression "larger than or equal to" or "smaller than or equal to" is used, but this expression is only a description for expressing an example, and thus does not exclude the description of the expression "larger than" or "smaller than" A condition described by the expression "larger than or equal to" can be replaced by a condition described by the expression "larger than" A condition described by the expression "smaller than or equal to" can be replaced by a condition described by the expression "smaller than". A condition described by the expressions "larger than or equal to" and "smaller than" can be replaced by a condition described by the expressions "larger than" and "smaller than or equal to".

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, modifications and changes may be made thereto without departing from the scope of the disclosure. Therefore, the scope of the disclosure should not be defined as being limited to the embodiments, but should be defined by the appended claims and equivalents thereof

What is claimed is:
1. A method performed by a terminal in a wireless communication system, the method comprising:
 receiving, from a base station, a message including information on a pattern of integrity protection;
 identifying the pattern of the integrity protection based on the information, wherein the pattern of the integrity protection indicates at least one packet to which the integrity protection is applied among a plurality of packets,
wherein the information comprises an index associated with the integrity protection, and
wherein the at least one packet to which the integrity protection is applied is identified based on the index.

2. The method of claim 1, further comprising:
transmitting, to the base station, a message indicating completion of configuration of the pattern of the integrity protection.

3. The method of claim 2, further comprising:
configuring the pattern of the integrity protection for receiving or transmitting the plurality of packets.

4. The method of claim 1,
wherein the message including the information on the pattern of the integrity protection is received via a radio resource control (RRC) signaling, and
wherein the message including the information on the pattern of the integrity protection comprises RRC connection reconfiguration message.

5. The method of claim 1,
wherein the pattern of the integrity protection is configured in case that a radio bearer is set or reconfigured.

6. The method of claim 1,
wherein another packet of the plurality of packets includes a predetermined value in MAC field,
wherein the another packet is not the at least one packet.

7. A method performed by a base station in a wireless communication system, the method comprising:
transmitting, to a terminal, a message including information on a pattern of integrity protection,
wherein the information is used to identify the pattern of the integrity protection,
wherein the pattern of the integrity protection indicates at least one packet to which the integrity protection is applied among a plurality of packets,
wherein the information comprises an index associated with the integrity protection, and
wherein the at least one packet to which the integrity protection is applied is identified based on the index.

8. The method of claim 7, further comprising:
receiving, from the terminal, a message indicating completion of configuration of the pattern of the integrity protection.

9. The method of claim 8, further comprising:
configuring the pattern of the integrity protection for receiving or transmitting the plurality of packets.

10. The method of claim 7,
wherein the message including the information on the pattern of the integrity protection is transmitted via a radio resource control (RRC) signaling, and
wherein the message including the information on the pattern of the integrity protection comprises RRC connection reconfiguration message.

11. The method of claim 7,
wherein the pattern of the integrity protection is configured in case that a radio bearer is set or reconfigured.

12. The method of claim 7,
wherein another packet of the plurality of packets includes a predetermined value in MAC field,
wherein the another packet is not the at least one packet.

13. A terminal in a wireless communication system, comprising:
a transceiver; and
at least one processor coupled to the transceiver,
wherein the at least one processor is configured to:
receive, from a base station, a message including information on a pattern of integrity protection, and
identify the pattern of the integrity protection based on the information, and
wherein the pattern of the integrity protection indicates at least one packet to which the integrity protection is applied among a plurality of packets,
wherein the information comprises an index associated with the integrity protection, and
wherein the at least one packet to which the integrity protection is applied is identified based on the index.

14. The terminal of claim 13, wherein the at least one processor is further configured to:
transmit, to the base station, a message indicating completion of configuration of the pattern of the integrity protection.

15. The terminal of claim 14, wherein the at least one processor is further configured to:
configure the pattern of the integrity protection for receiving or transmitting the plurality of packets.

16. The terminal of claim 13,
wherein the message including the information on the pattern of the integrity protection is received via a radio resource control (RRC) signaling, and
wherein the message including the information on the pattern of the integrity protection comprises RRC connection reconfiguration message.

17. The terminal of claim 13,
wherein the pattern of the integrity protection is configured in case that a radio bearer is set or reconfigured.

* * * * *